(12) United States Patent
Ishida

(10) Patent No.: US 8,167,106 B2
(45) Date of Patent: May 1, 2012

(54) CLUTCH DRIVE APPARATUS AND VEHICLE EQUIPPED WITH THE SAME

(75) Inventor: Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 483 days.

(21) Appl. No.: 12/264,189

(22) Filed: Nov. 3, 2008

(65) Prior Publication Data

US 2009/0127062 A1 May 21, 2009

(30) Foreign Application Priority Data

Nov. 15, 2007 (JP) ................. 2007-296467
Jan. 9, 2008 (JP) ................. 2008-002655

(51) Int. Cl.
*F16D 28/00* (2006.01)
*B62M 25/08* (2006.01)

(52) U.S. Cl. .............. 192/84.6; 192/84.7; 192/89.1; 192/90

(58) Field of Classification Search .......... 192/84.6, 192/84.7, 89.21, 90
See application file for complete search history.

(56) References Cited

U.S. PATENT DOCUMENTS

| | | | | |
|---|---|---|---|---|
| 4,852,419 A | * | 8/1989 | Kittel et al. ............ | 74/89.14 |
| 5,678,673 A | * | 10/1997 | Borschert et al. ............ | 192/84.6 |
| 5,695,037 A | * | 12/1997 | Borschert et al. ............ | 192/84.1 |
| 2005/0115790 A1 | | 6/2005 | Iizuka et al. | |
| 2006/0169569 A1 | | 8/2006 | Ooishi et al. | |
| 2007/0240958 A1 | * | 10/2007 | Kosugi et al. .................. | 192/20 |

FOREIGN PATENT DOCUMENTS

| | | |
|---|---|---|
| JP | 11-222043 | 8/1999 |
| JP | 2007-069638 | 3/2007 |

OTHER PUBLICATIONS

European Search Report, Feb. 18, 2009, for European Patent Application No. EP 08 25 3718.

* cited by examiner

*Primary Examiner* — David D Le
*Assistant Examiner* — Jacob S Scott
(74) *Attorney, Agent, or Firm* — Dickstein Shapiro LLP

(57) ABSTRACT

A clutch drive apparatus includes a clutch actuator and a drive force transmission mechanism that transmits the drive force of the clutch actuator to the clutch. The drive force transmission mechanism includes a case body and a case cover that is closed on the case body and supports the clutch actuator and a worm shaft. An opening is formed in the case cover to expose a marker member that determines a reference position of an auxiliary elastic body. A maintenance lid for covering the opening is mounted in a vehicle head pipe.

20 Claims, 22 Drawing Sheets

CLUTCH DRIVE APPARATUS AND VEHICLE EQUIPPED WITH THE SAME

PRIORITY INFORMATION

This patent application is based on and claims priority under 35 U.S.C. §119 to Japanese Patent Application No. 2007-296467, filed on Nov. 15, 2007, and Japanese Patent Application No. 2008-002655, filed on Jan. 9, 2008, the entire contents of which are hereby expressly incorporated by reference.

TECHNICAL FIELD

The present invention relates to a clutch drive apparatus for performing clutch engagement or disengagement by using the drive force of an actuator and to a vehicle including the clutch drive apparatus.

BACKGROUND ART

Conventionally, there are known vehicles, such as motorcycles and ATVs (All Terrain Vehicles), of the type including a so-called AMT (automated manual transmission). See, for example, Japanese Patent Publication No. 2007-069638. The AMT is one type of clutch drive apparatuses that perform clutch engagement or disengagement by using the drive force of an actuator, such as an electric motor.

The AMT described in Japanese Patent Publication No. 2007-069638 includes an electric motor and a hydraulic master cylinder that is driven by the electric motor and causes a clutch to be engaged and disengaged. A hydraulic circuit is provided in a power transmission mechanism between the electric motor and the clutch. The AMT further includes an auxiliary spring that assists disengagement of the clutch performed by the electric motor.

For the AMT including the auxiliary spring, an idle amount of the clutch is set to attain a match between a neutral position where an assist force associated with the auxiliary spring is zero and a "meet point" position, which is a position where disengagement of the clutch is initiated. The idle of the clutch refers to a state where no load from the clutch is applied even after the initiation of rotation of the electric motor, and the idle amount of the clutch refers to the rotational speed of the electric motor until reaching the meet point from the initiation of rotation of the electric motor. In an AMT including a hydraulic circuit in a power transmission mechanism, the idle amount of a clutch is regulated on the side of the hydraulic circuit (for example, through regulation of the hydraulic pressure). Hence, the idle amount does not have to be regulated in a mechanical portion of the power transmission mechanism.

Also known is an AMT in which a hydraulic circuit is not provided in a power transmission mechanism located between a clutch actuator and a clutch. See in this regard, for example, Japanese Patent Publication No. 11-222043. However, the AMT described in Japanese Patent Publication No. 11-222043 does not include an auxiliary spring. In the AMT described in Japanese Patent Publication No. 11-222043, a clutch disengagement sensor for detecting disengagement of the clutch is provided in order to minimize the influence due to idling of the clutch is reduced to thereby enable, for example, reduction of the time necessary for performing a smooth transmission operation. However, in the case of the AMT described in Japanese Patent Publication No. 11-222043, the provision of clutch disengagement sensor while necessary leads to an increase in the number of components/parts and associated cost involved.

SUMMARY

The present invention has been made in view of the problems described above. To this end, it is an object of the present invention to suppress adverse effects associated with idling of a clutch even without a clutch disengagement sensor in a clutch drive apparatus which includes a clutch actuator that generates a drive force causing engagement or disengagement of the clutch and an auxiliary elastic body that assists with the engagement or disengagement of the clutch performed by the clutch actuator.

A clutch drive apparatus according to the present invention includes a clutch; a clutch actuator that generates a drive force causing engagement or disengagement of the clutch; a drive force transmission mechanism that includes one or more solids of revolution including a solid of revolution connected to the clutch actuator and that transmits the drive force of the clutch actuator to the clutch; and an auxiliary elastic body that has a first end pivotally supported and a second end connected to any one of the solids of revolution, and that, during a state change from a state where the clutch is started to be disengaged to a state of further disengagement, urges the solid of revolution connected to the auxiliary elastic body along a direction causing the clutch to be disengaged, wherein a marker member is provided in any one of the solids of revolution, the marker member being indicative of a reference position where a line connecting between a center pivot axis of the auxiliary elastic body on the first end side and a axis of rotation of the solid of revolution connected to the auxiliary elastic body matches with an expansion/compression direction of the auxiliary elastic body.

According to the clutch drive apparatus of the present invention, the idle amount of the clutch can be easily adjusted in the manner that a meet point of the clutch (in other words, the disengagement start position) is adjusted while the auxiliary elastic body is being maintained at the reference position by use of the marker member. Consequently, adverse effects associated with idling of the clutch can be suppressed even without a clutch disengagement sensor.

As described above, according to the present invention, adverse effects associated with idling of the clutch can be suppressed even without a clutch disengagement sensor in a clutch drive apparatus comprising a clutch actuator that generates a drive force causing engagement or disengagement of the clutch and an auxiliary elastic body that assists with engagement or disengagement of the clutch performed by the clutch actuator.

BRIEF DESCRIPTION OF THE DRAWINGS

FIG. 9b is a schematic view showing the ball positions of a ball cam during the clutch disengagement event of FIG. 9a.

DETAILED DESCRIPTION

An embodiment of the present invention will be described in detail in reference to the appended drawings.

Motorcycle

Figure 1:
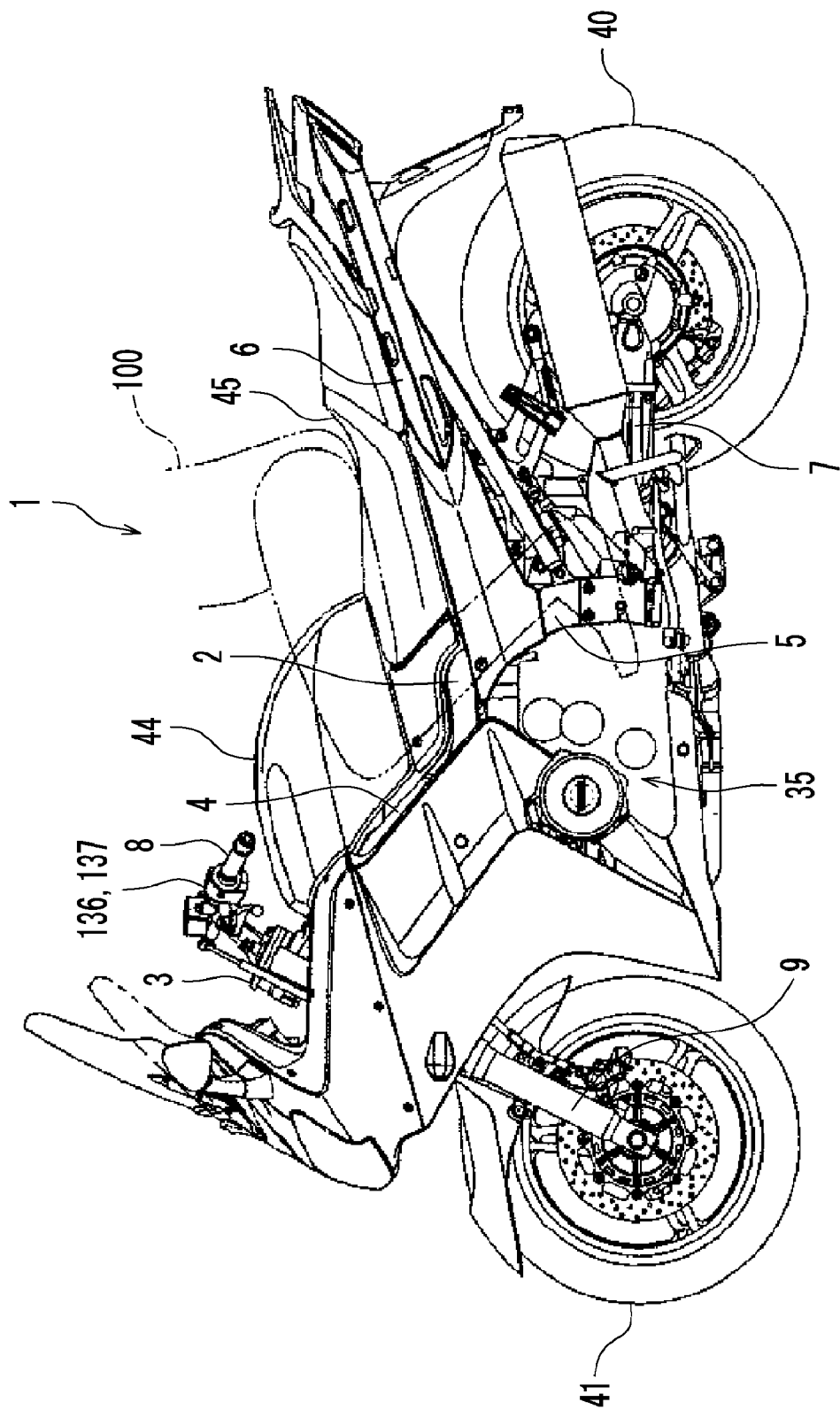
FIG. 1 is a side view of a motorcycle.

FIG. 1 is a side view showing a motorcycle 1 in accordance with an embodiment of the present invention. The motorcycle 1 includes a vehicle body frame 2. The vehicle body frame 2 includes a head pipe 3, a main frame 4 extending backward from the head pipe 3, and a rear-arm bracket 5 extending downward from a rear portion of the main frame 4.

A front fork 9 is supported by the head pipe 3. A steering handle bar 8 is provided on the upper end of the front fork 9, and a front wheel 41 is provided on the lower ends thereof. Further, a fuel tank 44 is disposed in an upper portion of the main frame 4. A seat 45 is arranged rearward of the fuel tank 44. The seat 45 is placed on a seat rail 6. A power unit 35 is suspended by the main frame 4 and the rear-arm bracket 5. A front edge portion of a rear arm 7 is vertically pivotably supported by the rear-arm bracket 5. A rear wheel 40 is supported by a rear end portion of the rear arm 7.

Automatic transmission operation switches 136 and 137 (see FIG. 2) to be operated by a rider 100 who rides astride the seat 45 are provided to the steerling handle bar 8.

Power Unit

Figure 3:
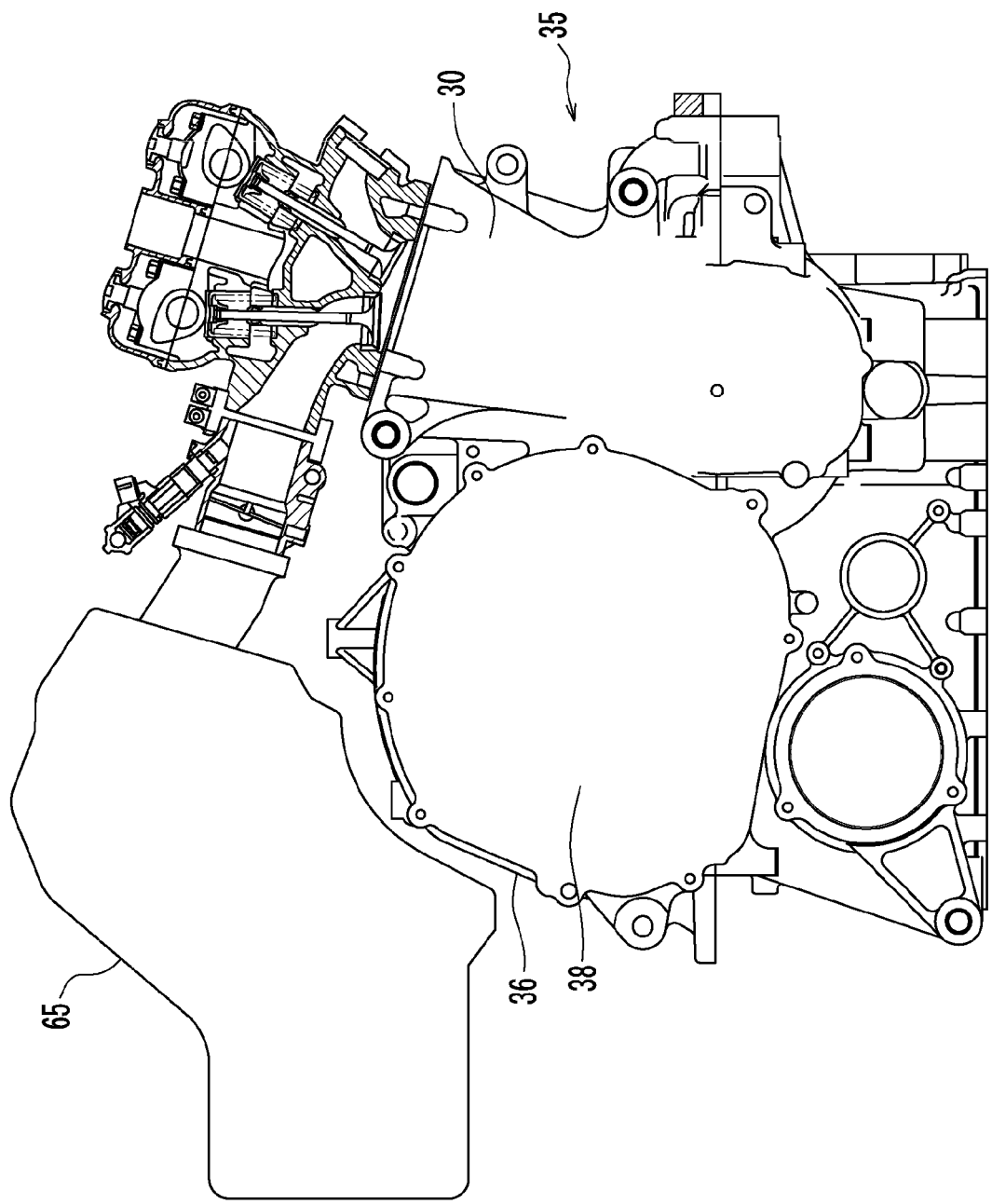
FIG. 3 is a right side view of a power unit of motorcycle of FIG. 1.

FIG. 3 is a right side view of the power unit 35. Reference numeral 65 denotes an aircleaner.

Figure 4:
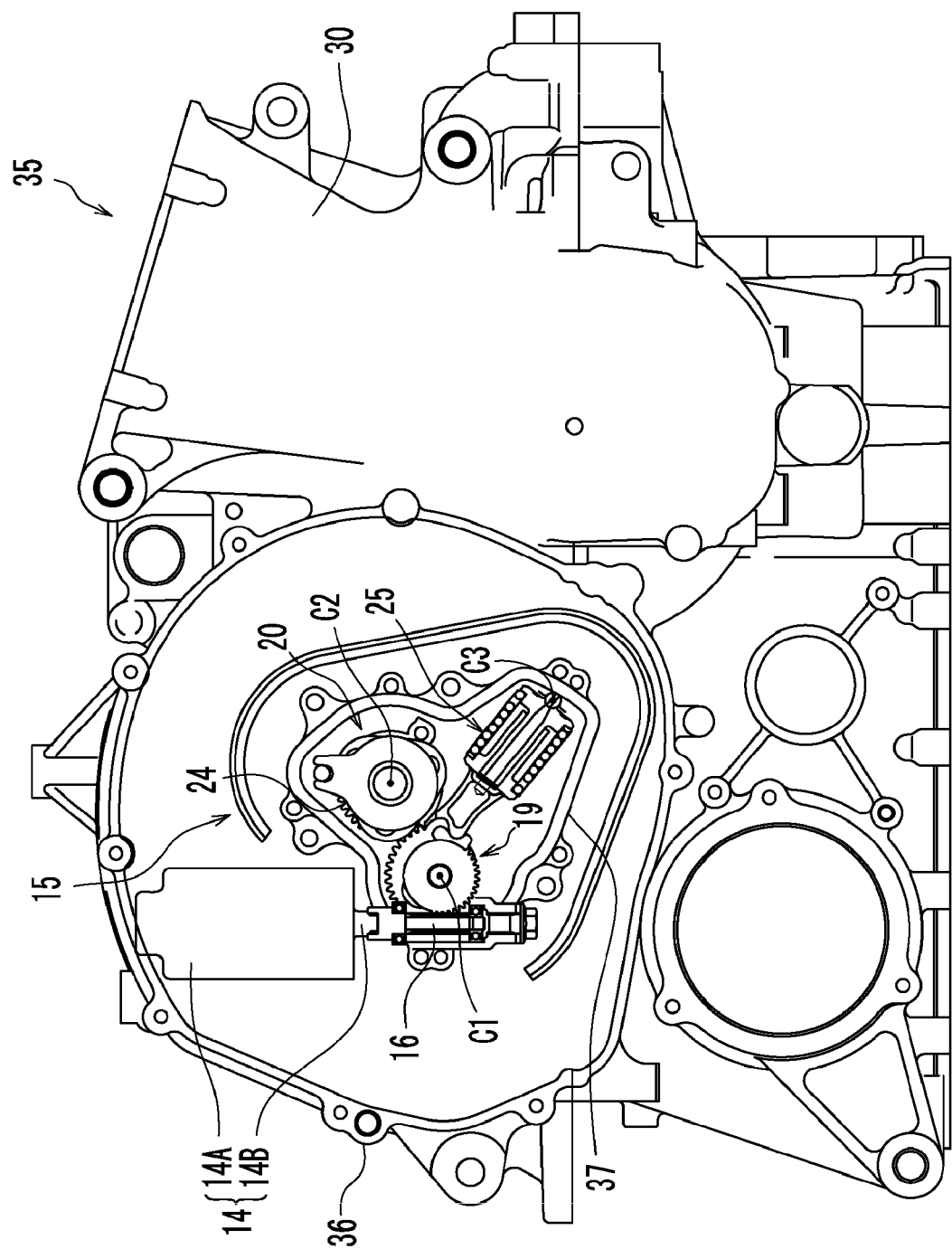
FIG. 4 is a right side view of a portion of the power unit of FIG. 3 in a state where a cover is removed to show a clutch drive device including a clutch actuator and a drive force transmission mechanism.

FIG. 4 is a right side view of major portions of the power unit 35 in a state where a cover 38 (FIG. 3) and a case cover 32 (see FIG. 5) serving as a lid of a case body 37 are removed.

Figure 5:
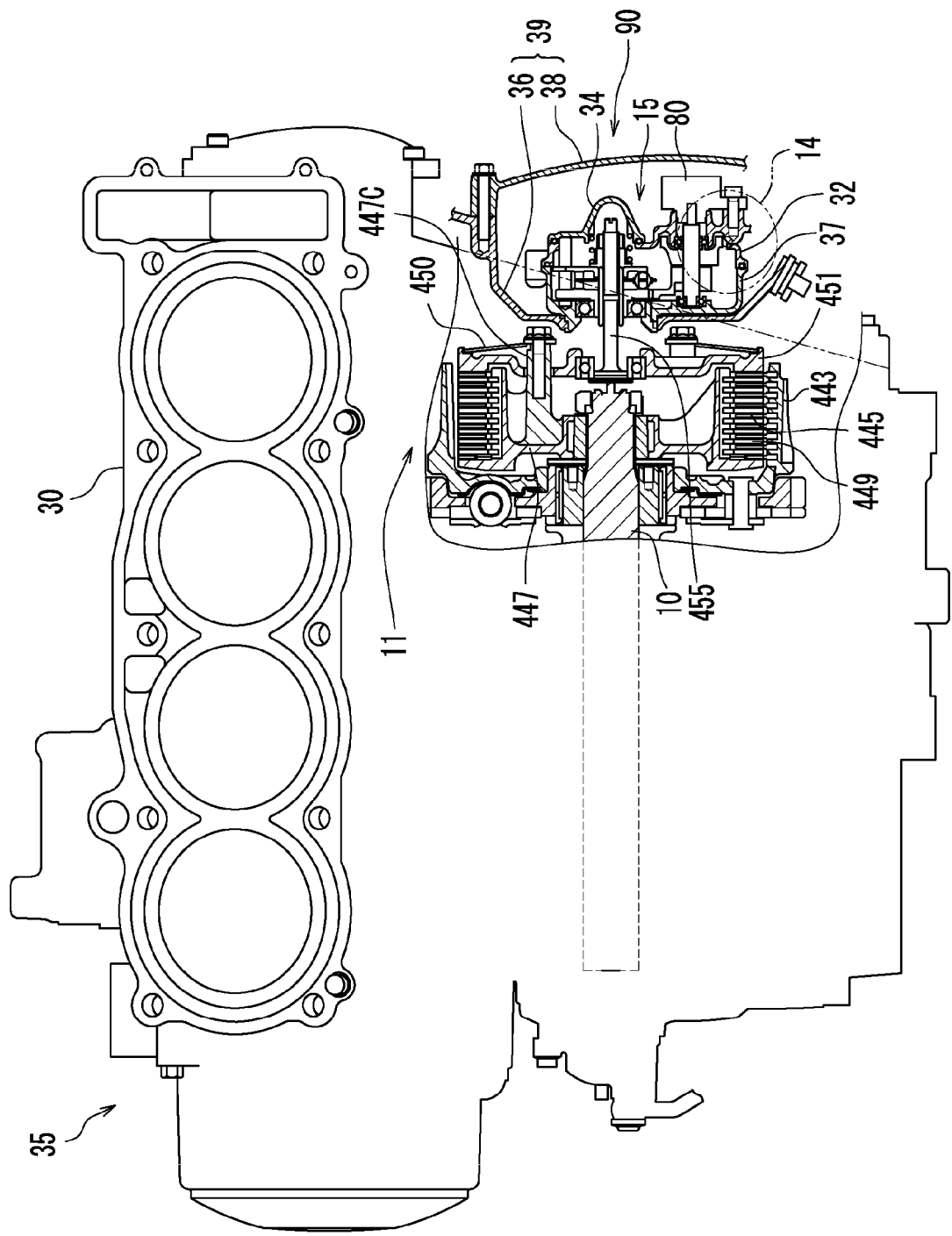
FIG. 5 is a partially cut away top plan view of the power unit of FIG. 4.

FIG. 5 is a partially cut away plan view of the power unit 35.

Figure 6:
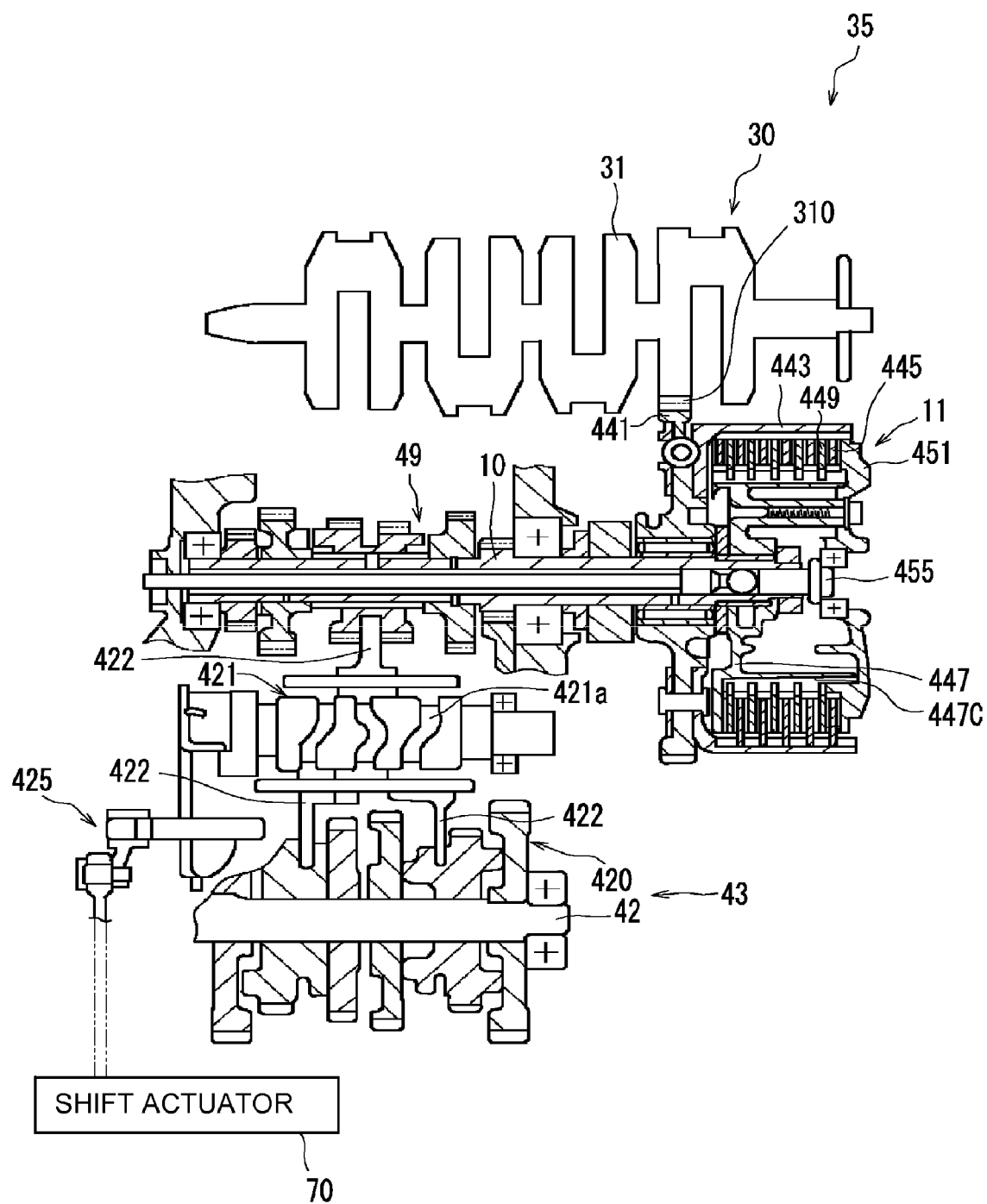
FIG. 6 is a schematic view showing the essential components of the power unit of FIG. 3.

FIG. 6 is a schematic view of the interior configuration of the power unit 35. As shown in FIG. 6, the power unit 35 includes an engine 30, a clutch 11, and a transmission 43. Further, the power unit 35 includes a clutch actuator 14 (see FIG. 4) that causes engagement or disengagement of the clutch 11, and a shift actuator 70 (FIG. 6) that controls the operation of the transmission 43.

Engine

In the present embodiment, the engine 30 is a water-cooled four-cycle parallel four-cylinder engine. However, the engine 30 is not limited to an internal combustion engine, such as a gasoline engine, but may be an engine of a different type, such as an electric motor engine. Alternatively, the engine 30 may be of a combined type of a gasoline engine and an electric motor engine. The engine 30 has a crankshaft 31 extending along the lateral (left-right) direction of motorcycle 1. A gear 310 is formed on the crankshaft 31.

Clutch

As shown in FIG. 6, the clutch 11 of the present embodiment is a multi-disc friction clutch. However, clutch 11 is not limited in type to the multi-disc friction clutch. The clutch 11 includes a clutch housing 443, a plurality of friction plates 445 provided integral with the clutch housing 443, a clutch boss 447, a plurality of clutch plates 449 provided integral with the clutch boss 447, and a pressure plate 451 that causes the friction plates 445 and the clutch plates 449 to be in frictional contact with each other.

A gear 441 is supported on a main shaft 10 to be rotatable relative to the main shaft 10. The gear 441 meshes with the gear 310 of the crankshaft 31. The clutch housing 443 is fixed to the gear 441, and the clutch housing 443 rotates integrally with the gear 441. Hence, torque is transmitted to the clutch housing 443 from the crankshaft 31 via the gear 441.

As shown in FIG. 5, a plurality of cylindrical guide sections 447C provided integral with the clutch boss 447 and extending along an axial (longitudinal) direction of the main shaft 10 are disposed on the inner side of the clutch boss 447. A spring 450 formed of a disc spring is mounted onto the guide sections 447C. The spring 450 urges the pressure plate 451 towards the lefthand side of FIG. 5. More specifically, the spring 450 urges the pressure plate 451 along the longitudinal axis of the main shaft in the direction of engagement of the clutch 11.

While described further in detail below, the pressure plate 451 is driven by the clutch actuator 14 to move along an axial direction of a slide shaft 455. In the event of engagement of the clutch 11, the slide shaft 455 moves to the lefthand side of FIG. 5, and also the pressure plate 451 moves to the lefthand side. As a consequence, the pressure plate 451 having received the urging force of the spring 450 causes the friction plates 445 and the clutch plates 449 to enter pressed contact with one another. Thereby, a frictional force occurs between the friction plate 445 and the clutch plates 449, whereby a state is created where a drive force is transmitted from the clutch housing 443 to the clutch boss 447.

On the other hand, in the event of disengagement of the clutch 11, the slide shaft 455 moves to the righthand side of FIG. 5, and also the pressure plate 451 moves to the righthand side of FIG. 5 in opposition to the urging force of the spring 450. As a consequence, the frictional contact state between the friction plate 445 and the clutch plates 449 is cancelled, whereby a state is created where the drive force is not transmitted from the clutch housing 443 to the clutch boss 447.

In this manner, in accordance with the relationship in magnitude between the drive force of the clutch actuator 14 and the urging force of the spring 450, the pressure plate 451 moves to one side or the other in the axial direction of the main shaft 10, and the clutch 11 enters the engaged state or disengaged state in accordance with the movement.

Transmission

As shown in FIG. 6, the transmission 43 includes the main shaft 10 disposed parallel to the crankshaft 31 of the engine 30 and a drive shaft 42 disposed parallel to the main shaft 10. A set of multiple speed change gears 49 are provided on the main shaft 10. Also a set of multiple speed change gears 420 are provided on the drive shaft 42. The speed change gear set 49 on the main shaft 10 meshes with the speed change gear set 420 on the drive shaft 42. In FIG. 6, the speed change gear set 49 and the speed change gear set 420 are depicted in a state where they are separate from one another. The speed change gear set 49 and the speed change gear set 420 are mounted in such a manner that, except for one pair of speed change gears, any one or both of the sets are in an idle-run state (or, a lost motion state) relative to the main shaft 10 or the drive shaft 42. Hence, transmission of the torque from the main shaft 10 to the drive shaft 42 is performed only for a selected pair of speed change gears.

A gear change operation for changing the transmission gear ratio by selecting a speed change gear 49 and a speed change gear 420 is performed through the rotation of a shift cam 421. The shift cam 421 has a plurality of cam grooves 421a and shift forks 422 which are mounted to the respective cam grooves 421a. The respective shift forks 422 engage with predetermined speed change gears 49 and speed change gears 420 of the main shaft 10 and drive shaft 42, respectively. With the rotation of the shift cam 421, the shift forks 422 are guided by the cam grooves 421a and are thereby moved in the respective axial directions. Then, only a pair of a speed change gear 49 and speed change gear 420 in a position corresponding to a rotational angle of the shift cam 421 are, respectively, brought into fixed states through splines to the main shaft 10 and the drive shaft 42. Thereby, a speed change gear position is fixed, and the torque is transmitted at a predetermined transmission gear ratio between the main shaft 10 and the drive shaft 42 via the speed change gear 49 and the speed change gear 420.

The shift actuator 70 is connected to the shift cam 421 through a connecting mechanism 425. The shift actuator 70 is not specifically limited in type, such that one could use an electric motor or the like instead. The shift actuator 70 causes the rotation of the shift cam 421 through the connecting mechanism 425, thereby to perform a gear change operation.

Clutch Actuator and Drive Force Transmission Mechanism

Next, description will be given of the clutch actuator 14, which generates the drive force for engagement or disengagement of the clutch 11, and a drive force transmission mechanism 15, which transmits the drive force of the clutch actuator 14.

As shown in FIGS. 4 and 5, the clutch actuator 14 and the drive force transmission mechanism 15 are disposed in the interior of a casing 39 of the power unit 35. More specifically, as shown in FIG. 5, the casing 39 of the power unit 35 includes a crankcase 36 for housing the crankshaft 31 and the clutch 11, and a cover 38 that covers a portion of the right edge of the crankcase 36. The clutch actuator 14 and the drive force transmission mechanism 15 are disposed outside of the crankcase 36 and inside of the cover 38. In other words, the clutch actuator 14 and the drive force transmission mechanism 15 are covered by the cover 38 on the outer side of the crankcase 36.

The clutch actuator 14 and the drive force transmission mechanism 15 are disposed in one end section in the lateral direction in the casing 39. While the clutch actuator 14 and the drive force transmission mechanism 15 can be disposed in either the left edge portion or right edge portion in the casing 39, they are disposed in the right edge portion in the present embodiment. Further, in the present embodiment, the clutch actuator 14 and the drive force transmission mechanism 15 are disposed on the side where the clutch 11 is disposed in the lateral direction. However, the clutch actuator 14 and the drive force transmission mechanism 15 can be disposed on the side opposite the side where the clutch 11 is disposed in the lateral direction.

As shown in FIG. 4, the clutch actuator 14 of the present embodiment is configured as an electric motor. The clutch actuator 14 includes a substantially cylindrical motor body 14A and a drive shaft 14B protruding downward from the motor body 14A. The clutch actuator 14 is disposed in such a manner that the motor body 14A and the drive shaft 14B extend vertically.

Figure 11:
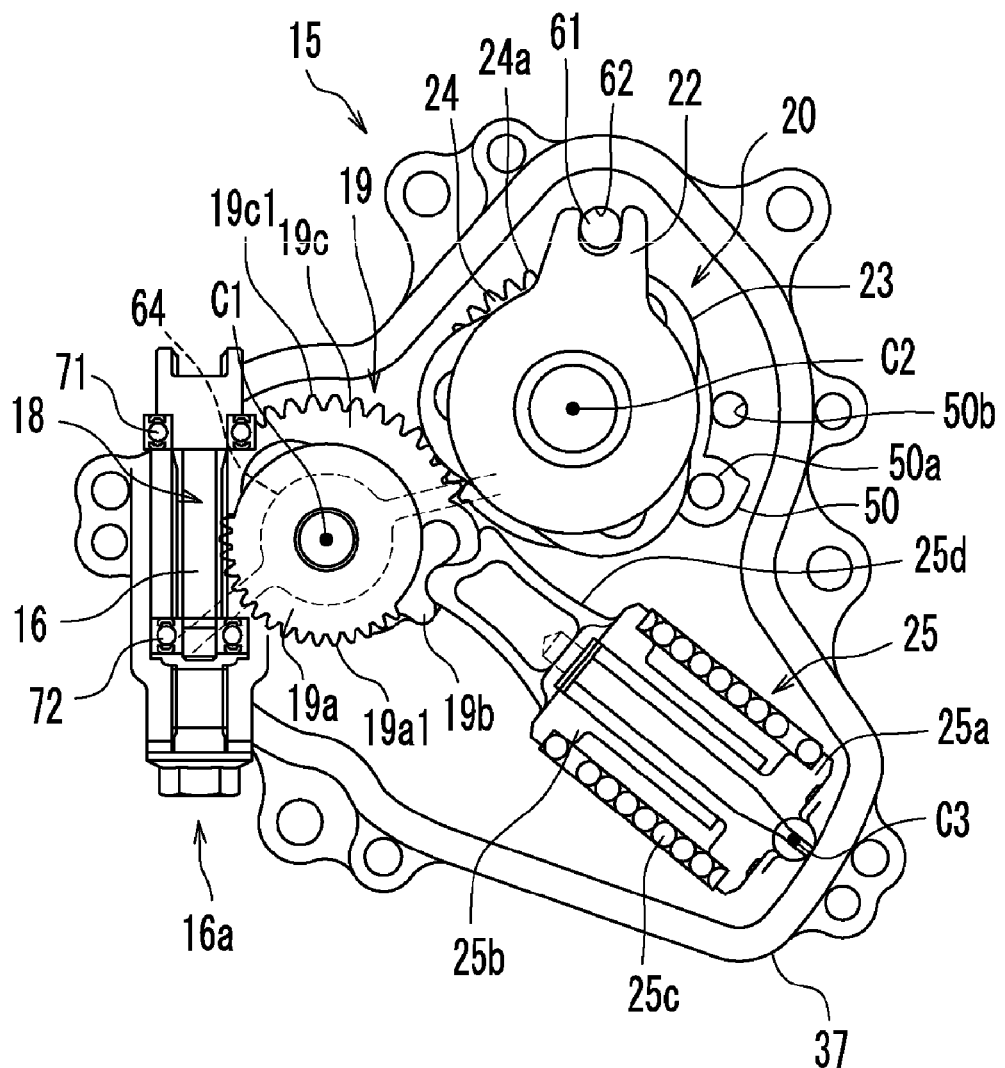
FIG. 11 is a side view of the drive force transmission mechanism at a control return side stopper position (clutch engagement event).

As shown in FIG. 11, the drive force transmission mechanism 15 includes a worm shaft 16 connected to the drive shaft 14B of the clutch actuator 14; a first solid of revolution 19 that engages with the worm shaft 16; a second solid of revolution 24 (see FIG. 13) that engages with the first solid of revolution 19; and a ball cam 20 that converts the torque of the second solid of revolution 24 into a force in the axial direction of the slide shaft 455. As described below, in the present embodiment, the second solid of revolution 24 is forms as part of the ball cam 20. However, the second solid of revolution 24 and the ball cam 20 may be implemented as independent members.

Figure 19:
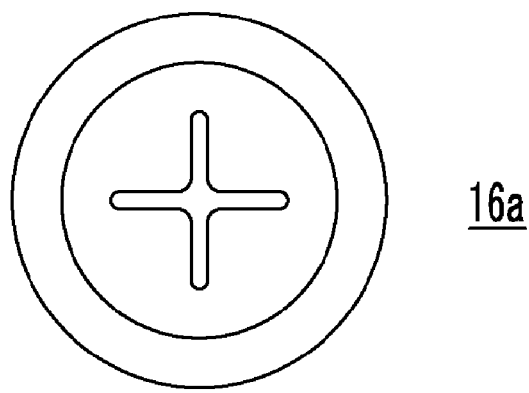
FIG. 19 is a front view of an engagement groove of a clutch actuator drive shaft.
Figure 20:
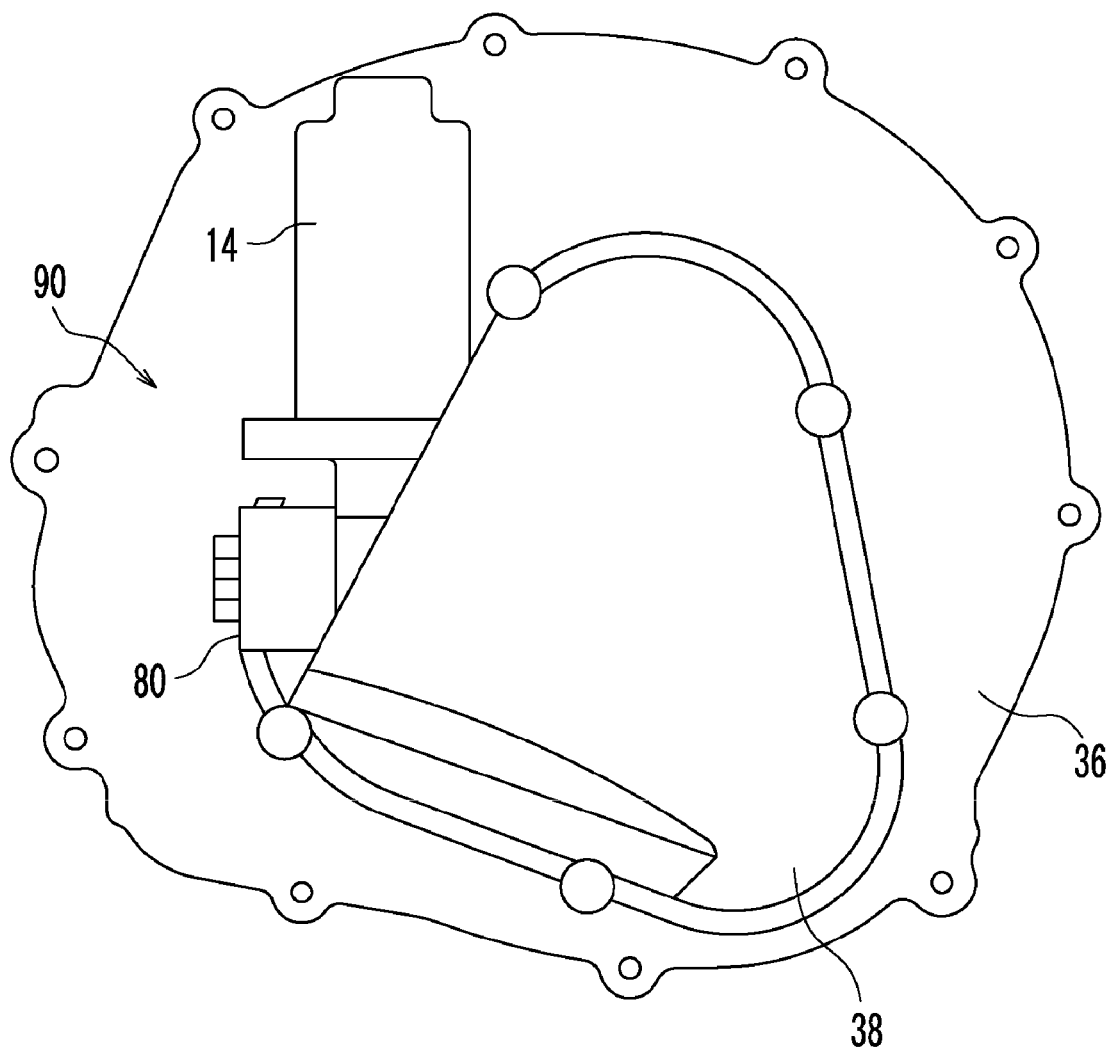
FIG. 20 is a side view of the clutch drive apparatus in an encased state.

The worm shaft 16 extends in the vertical direction. A spiral groove is formed on an outer peripheral surface of the worm shaft 16. The worm shaft 16 is rotatably supported by bearings 71 and 72. A lower end portion of the worm 16 is formed into a shape for engagement with a tool that forcibly rotates the worm 16 from the exterior portion of the case cover 32. In the present embodiment, a driver is used as the tool. In the present embodiment, an engagement groove 16a having a "+" shape for engagement with a Phillips screwdriver is formed in the lower end portion of the worm shaft 16, as shown in FIG. 19. However, the screwdriver is not limited to a Phillips screwdriver, but may be a slotted screwdriver, i.e. with a "−" head shape. In this case, the engagement groove for engagement with the screwdriver is formed into a groove having a "−" shape. The tool for rotating the worm shaft 16 is not limited to screwdrivers, but may be any other suitable tool. For example, the tool may be any one of, for example, a wrench such as a hexagonal wrench and a box wrench. In this case, the lower end portion of the worm shaft 16 is formed into a shape for engagement with the respective tool. For example, in the case of a hexagonal wrench, a hexagonal groove is formed in the lower end portion of the worm shaft 16. In the case where the tool is a hexagonal box wrench, a hexagonal protrusion is formed in the lower end portion of the worm shaft 16. In the present embodiment, the drive shaft 14B of the clutch actuator 14 and the worm shaft 16 are components different from each other, but the drive shaft 14B and the worm shaft 16 may be integrated together.

Figure 12:
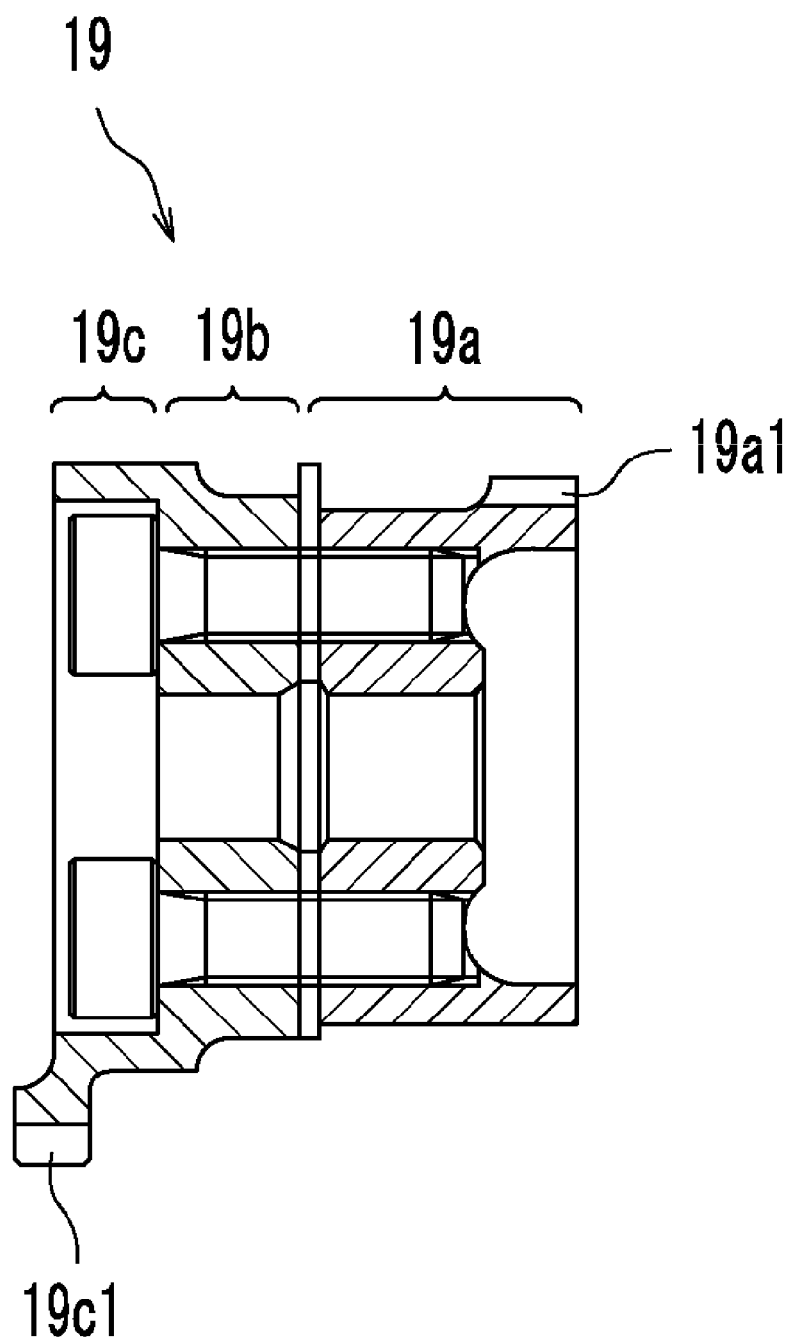
FIG. 12 is a cross sectional view of a first solid of revolution of the drive force transmission mechanism.

As shown in FIGS. 11 and 12, the first solid of revolution 19 includes a worm wheel portion 19a, a cam portion 19b, and a gear portion 19c in that order from the right side to the left side (or from the front face to the back face of the sheet of FIG. 11). As depicted in FIG. 11, teeth 19a1 are formed on an outer peripheral portion of worm wheel portion 19a. The worm wheel portion 19a meshes with the worm shaft 16. Hence, the torque of the worm shaft 16 is transmitted to the worm wheel portion 19a, and the first solid of revolution 19 rotates in accordance with the worm shaft 16. The worm shaft 16 and the worm wheel portion 19a of the first solid of revolution 19 together constitute a worm gear 18.

The cam portion 19b of the first solid of revolution 19 is in contact with a corresponding contact portion 25d of an assist spring unit 25 (FIG. 7a) which is described herein below.

Teeth 19c1 are formed on an outer peripheral portion of gear portion 19c of the first solid of revolution 19. The radius of the gear portion 19c (to be exact, the distance from the axis of rotation C1 of the first solid of revolution 19 to the teeth 19c1) is greater than the radius of the worm wheel portion 19a (to be exact, the distance from the axis of rotation C1 of the first solid of revolution 19 to the teeth 19a1). However, the difference in length between the radius of the gear portion 19c and the radius of the worm wheel portion 19a may be configured to be the opposite. Alternatively, the radius of the gear portion 19c and the radius of the worm wheel portion 19a may be equal to each other.

Figure 14:
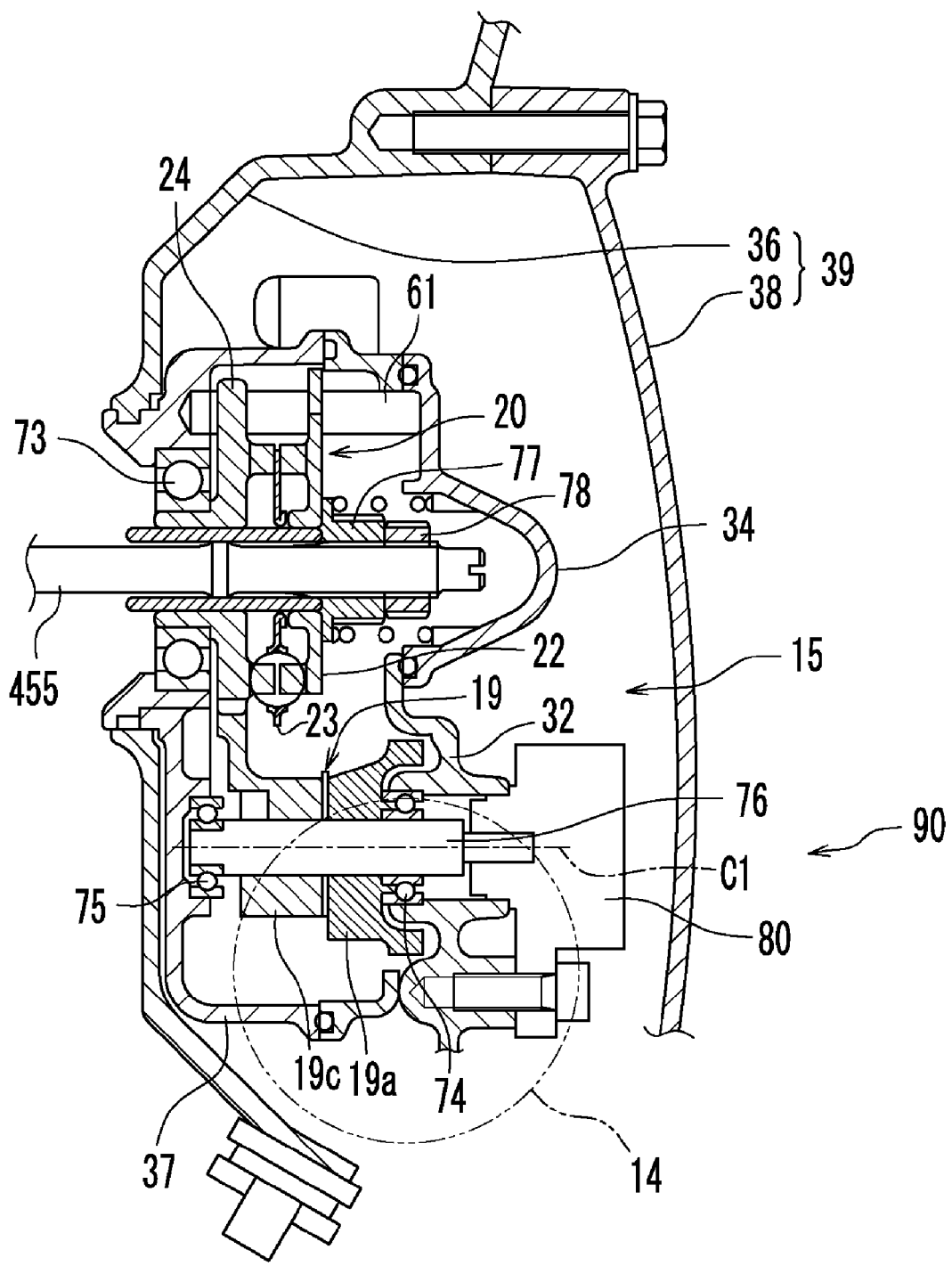
FIG. 14 is a partially cut away plan view of a clutch drive apparatus in accordance with the present invention.

As shown in FIG. 14, the axis of rotation C1 of the first solid of revolution 19 is the axial center of a shaft 76, and the first solid of revolution 19 rotates integrally with the shaft 76. The shaft 76 is rotatably supported by a bearing member 75 supported by the case body 37 and a bearing member 74 supported by the case cover 32.

Figure 16:
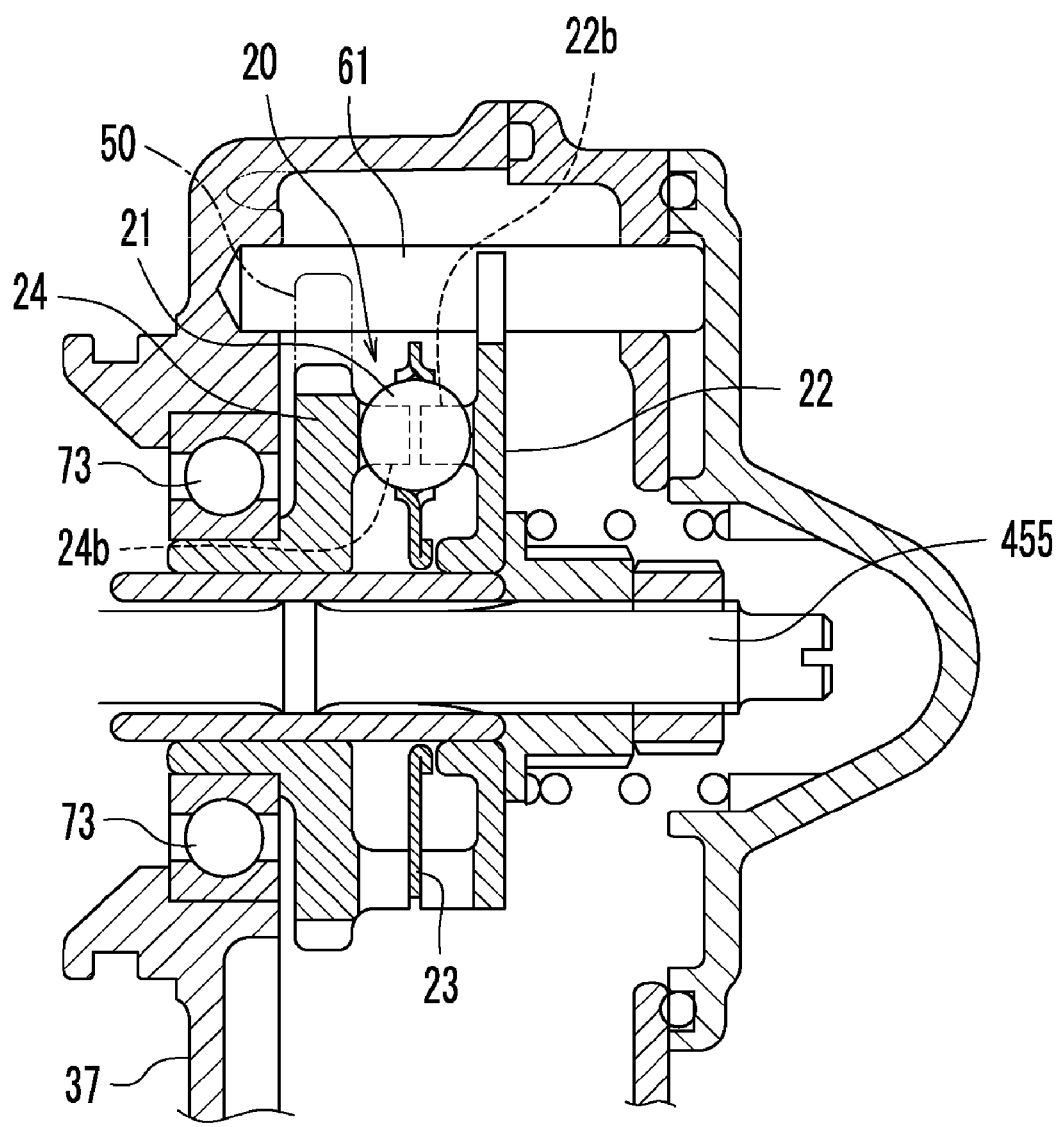
FIG. 16 is a cross sectional view of a ball cam in a state where the clutch is engaged.

As shown in FIGS. 11 and 16, the ball cam 20 includes a cam plate 22, a ball plate 23, and the second solid of revolution 24 disposed in that order from right hand side to left hand side (or from the front face to the back face of the sheet in FIG. 11). The cam plate 22 is fixed to the slide shaft 455 so as to be movable integrally with the slide shaft 455 in the axial direction of the slide shaft 455. However, the rotation of the cam plate 22 about the slide shaft 455 is restricted by a stopper pin 61.

The ball plate 23 rollably supports three balls 21 which are arranged at equal intervals in the circumferential direction. However, the number of balls 21 is not limited to three.

As shown in FIG. 16, the second solid of revolution 24 is supported by a bearing 73 to be rotatable about the slide shaft 455. On the other hand, the second solid of revolution 24 is supported not to move along the axial direction of the slide shaft 455.

Figure 13:
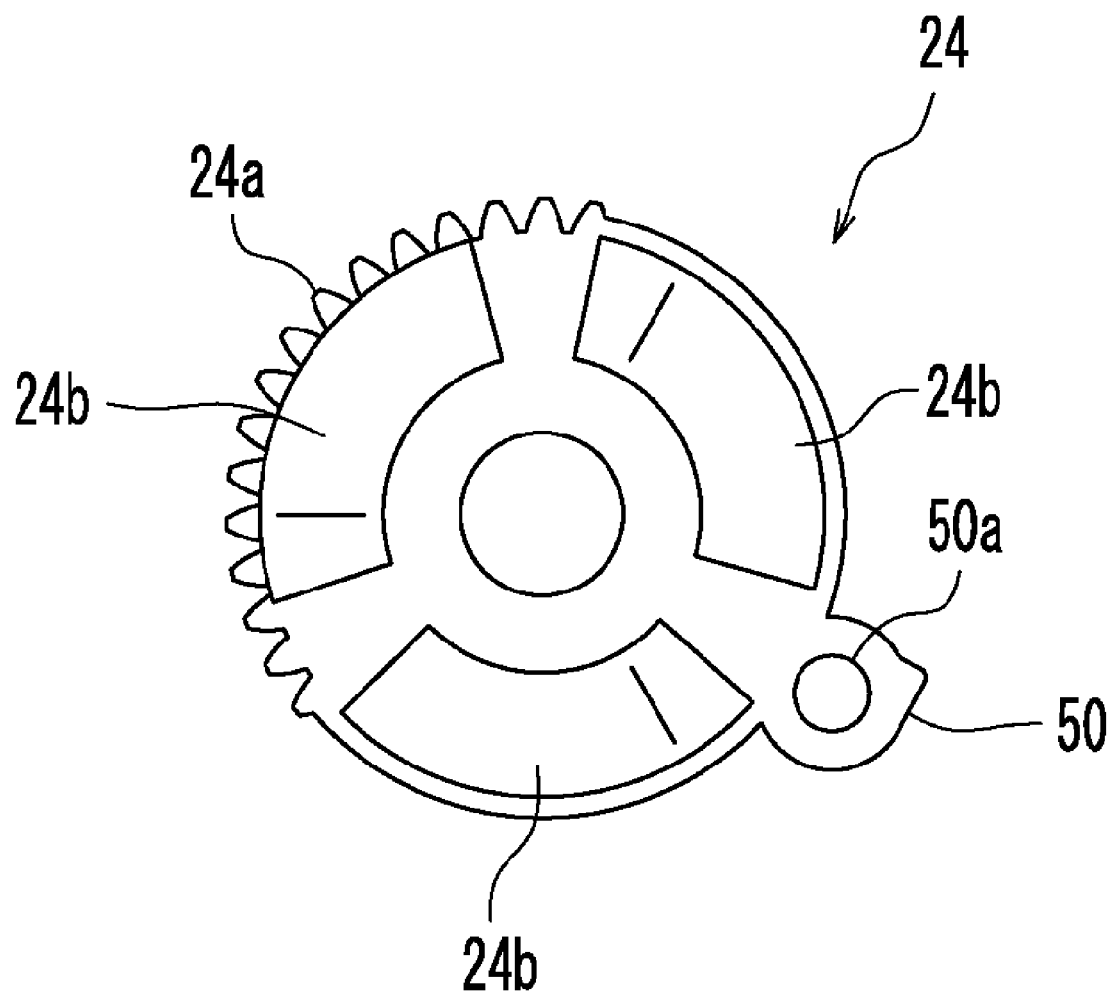
FIG. 13 is a cross sectional view of a second solid of revolution of the drive force transmission mechanism.

As shown in FIG. 13, teeth 24a are formed on the second solid of revolution 24. The teeth 24a mesh with the teeth 19c1 of the gear portion 19c of the first solid of revolution 19 (see FIG. 11). Hence, the first solid of revolution 19 and the second solid of revolution 24 are gear-connected through the teeth 19c1 and the teeth 24a such that torque from the first solid of revolution 19 is transmitted to the second solid of revolution 24.

Further, as shown in FIG. 13, a marker member 50 is provided on the second solid of revolution 24. A central portion of the marker member 50 is a pin hole 50a. A positioning pin 51 (FIG. 10) is inserted into the pin insertion hole 50a when positioning a reference position of the assist spring unit 25. A positioning method for the reference position will be described below.

Figure 9A:
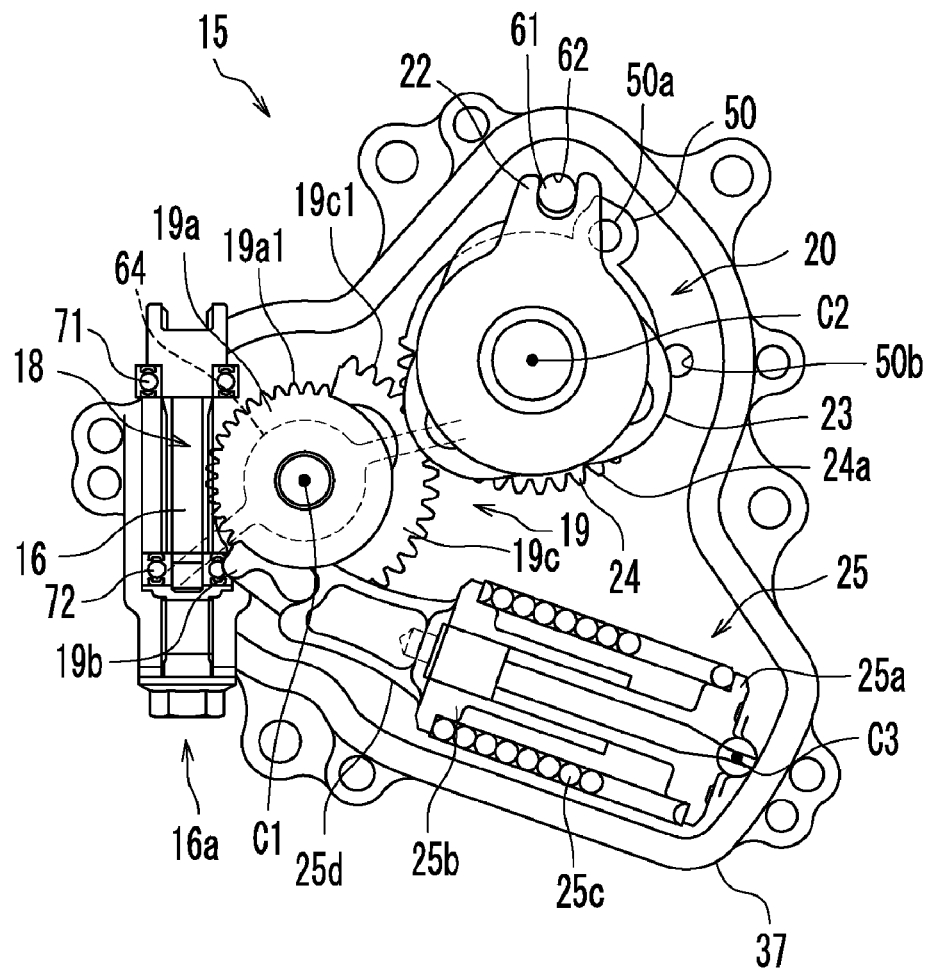
FIG. 9a is a side view of the drive force transmission mechanism at a control disengagement side position (clutch disengagement event).
Figure 9B:
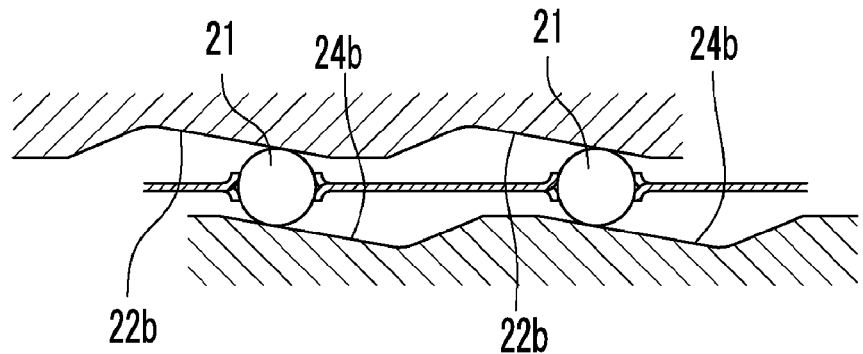
Figure 17:
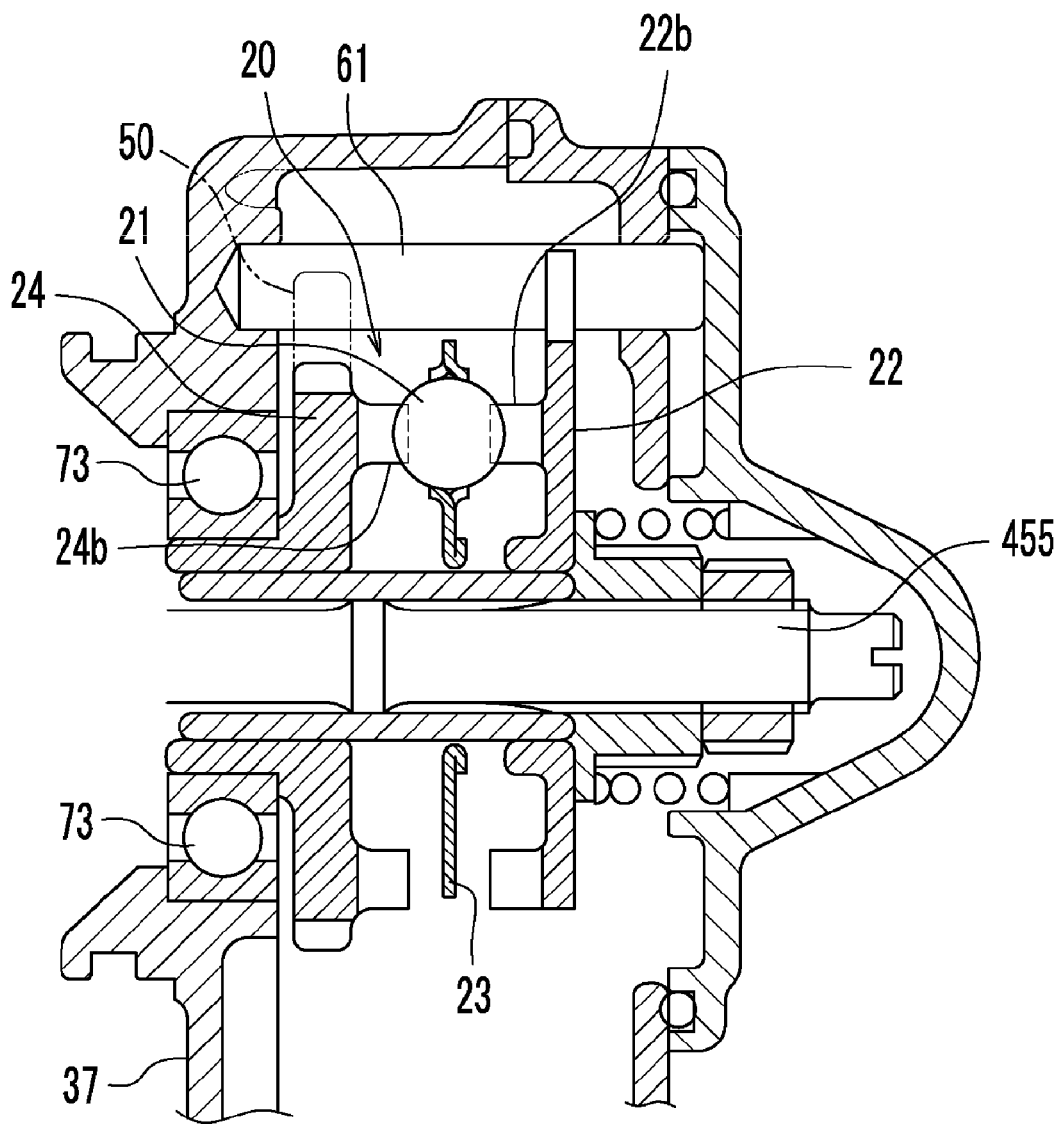
FIG. 17 is a cross sectional view of a ball cam in a state where the clutch is disengaged.

Further, cam surfaces 22b and 24b, which are sloped along the peripheral or circumferential direction, are respectively formed on the left hand side face (upper side in FIG. 9b) of the cam plate 22 and the right hand side face (lower side in FIG. 9b) of the second solid of revolution 24 (see also FIGS. 13, 17) to form a cam groove as shown in FIG. 9b. In this way, according to the present embodiment, the second solid of revolution 24 concurrently functions as a cam plate. Upon rotation of the second solid of revolution 24, a misalignment occurs between the relative positions of the cam surface 22b of the cam plate 22 and the cam surface 24b of the second solid of revolution 24. Consequently, the balls 21 climb and fall along the cam surfaces 22b and 24b. Accordingly, the cam plate 22 may be pushed by the balls 21 to the right hand side so as to slide to the right in FIG. 17. In association therewith, the slide shaft 455 also slides to the right, and the pressure plate 451 also slides to the right. As a consequence, the clutch 11 is shifted from an engaged state to a disengaged state.

As shown in FIG. 11, according to the present embodiment, the assist spring unit 25 for generating an assist force for assisting the disengagement of the clutch 11 is operatively coupled with the drive force transmission mechanism 15. The assist spring unit 25 includes a substantially cylindrical first case 25a and a substantially cylindrical second case 25b combined with the first case 25a, a compression coil spring 25c disposed between the first case 25a and the second case 25b, and the contact portion 25d provided to a leading end of the second case 25b. The contact portion 25d is in contact with the cam portion 19b of the first solid of revolution 19. The first case 25a and the second case 25b are urged by the compression coil spring 25c along the directions departing from each other. Because the second case 25b is urged toward the contact portion 25d by the compression coil spring 25c, the contact portion 25d is urged into a pressed contact condition with the cam portion 19b of the first solid of revolution 19. Thereby, the contact portion 25d and the cam portion 19b are connected together without the use of a fastener such as a bolt.

A base side of the first case 25a is pivotally supported by the case body 37 fixed on the crankcase 36. Hence, the assist spring unit 25 is configured to pivot about a center pivot axis C3 (FIG. 11).

Figure 21:
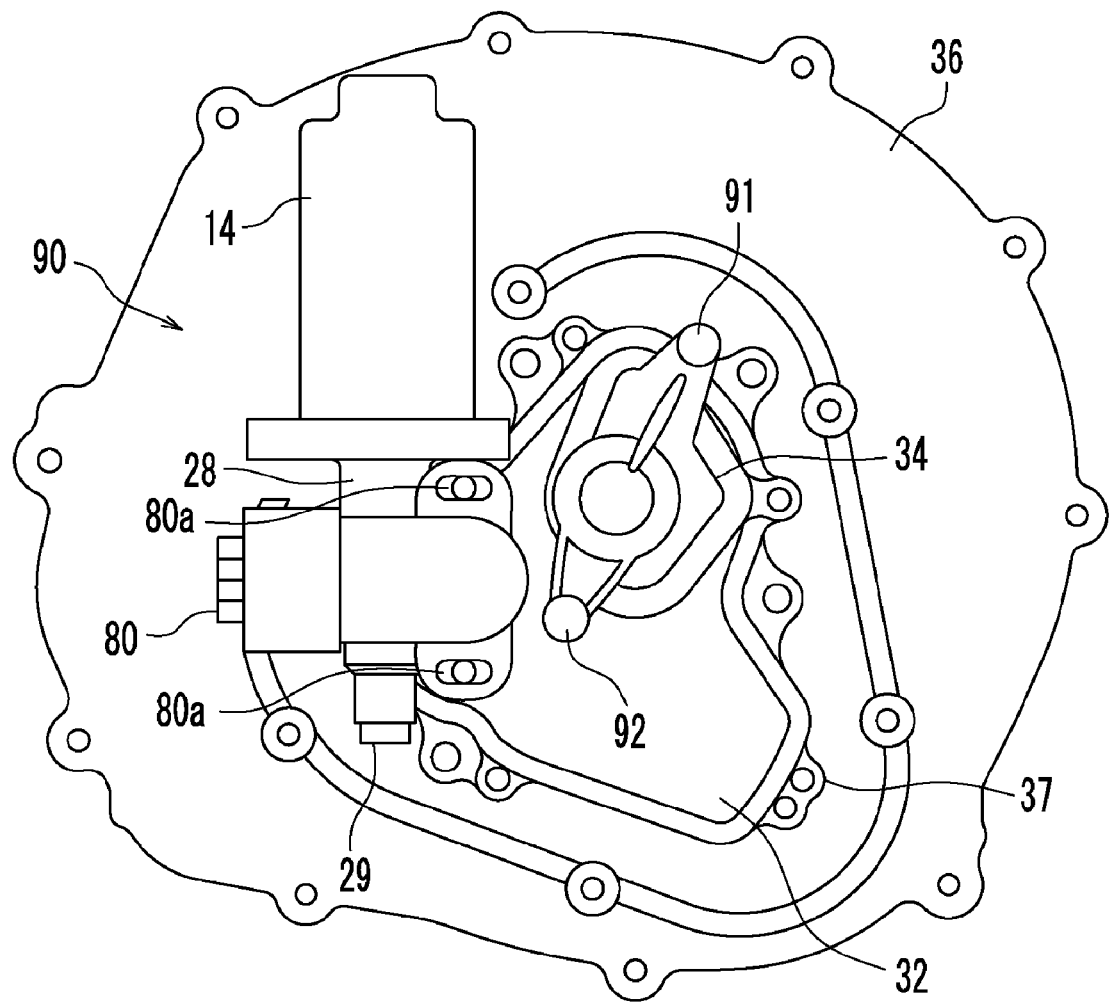
FIG. 21 is side view showing the clutch drive apparatus in the event of attachment of a potentiometer and a maintenance lid in a state where a case cover is removed.
Figure 22:
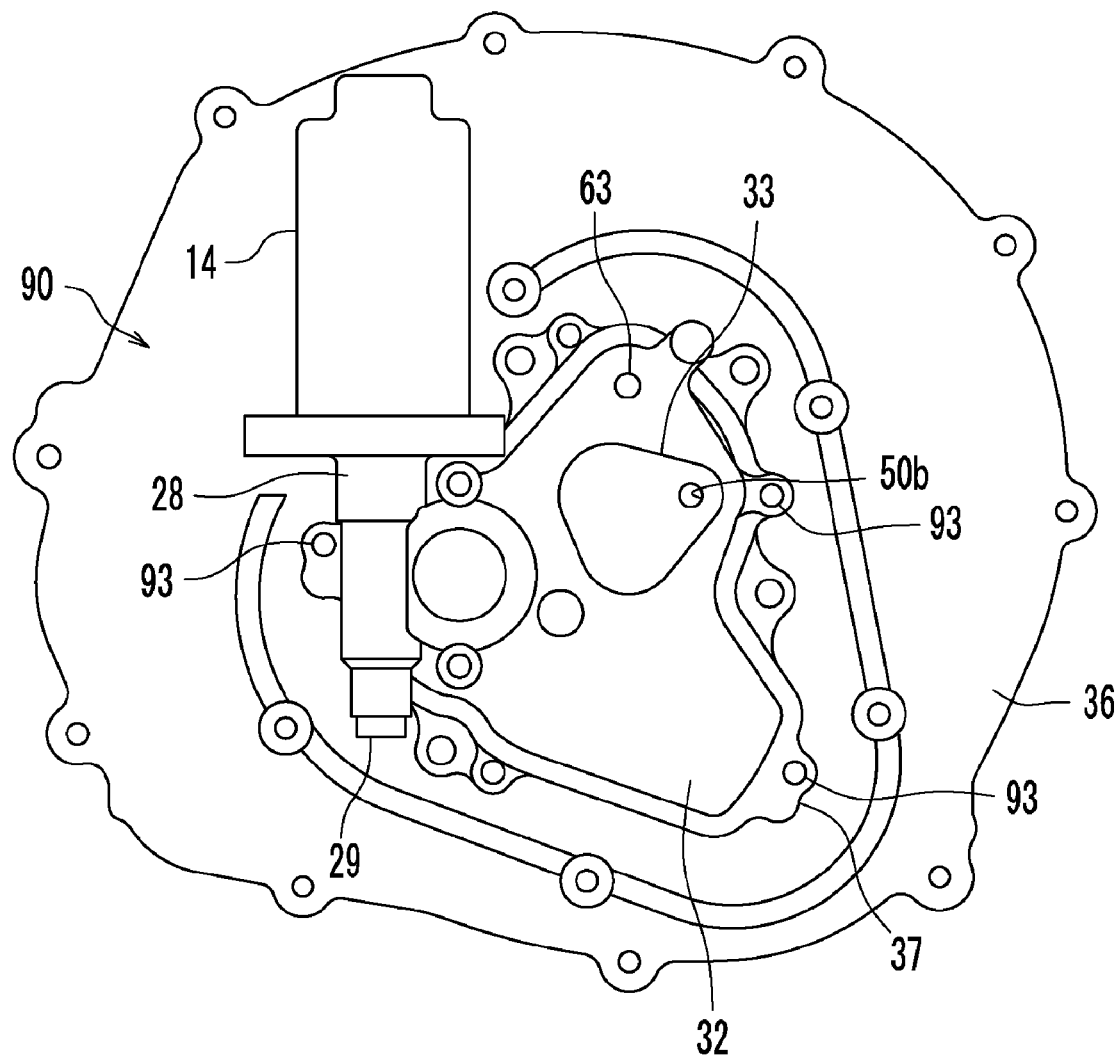
FIG. 22 is a side view of the clutch drive apparatus in the event of positioning of the reference position of the assist spring unit in a state where the maintenance lid is removed.

As shown in FIG. 22, a cylindrical portion 28 through which the drive shaft 14B of the clutch actuator 14 is inserted is integral with the case cover 32. The worm shaft 16 is incorporated in the cylindrical portion 28. The clutch actuator 14 is supported by the case cover 32 when the drive shaft 14B is inserted into the cylindrical portion 28. Further, an opening 33 is formed in the case cover 32. The opening 33 is covered by a maintenance lid 34 (FIG. 21) to be openable and closable. The maintenance lid 34 is overlaid on the case cover 32 to cover the opening portion 33, and is then fixed to the case cover 32 with bolts 91 and 92. In the event of positioning of the reference position of the assist spring unit 25 and adjustment of a clutch disengagement start position of the clutch 11, the maintenance lid 34 is removed from the case cover 32. Thereby, the opening 33 is exposed to cause a reference position hole to be visible through the opening.

A potentiometer 80 is removably mounted on the surface of the case cover 32. The potentiometer 80 is disposed in a position where it reads the rotational position of the first solid of revolution 19. The potentiometer 80 includes an elongated hole 80a for potential position adjustment. The potentiometer 80 detects the rotational speed of the motor body 14A in accordance with the rotational position of the first solid of revolution 19.

Shift-Change Operation

Figure 2:
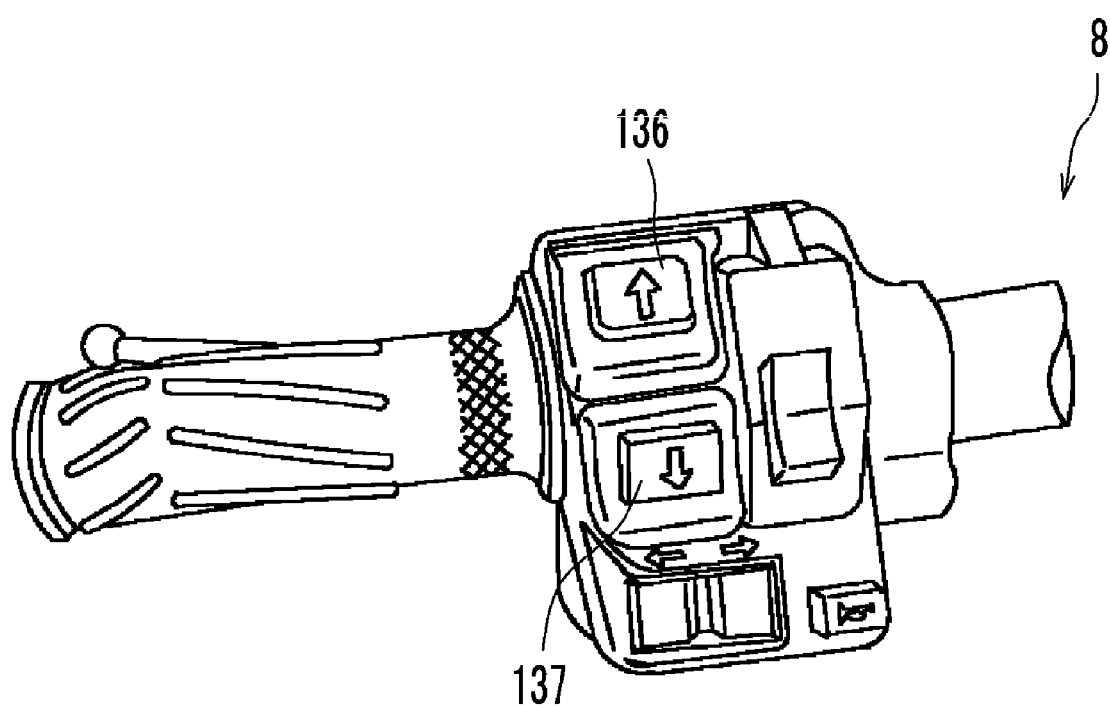
FIG. 2 is a perspective view of automatic transmission operation switches.

A shift change operation of the motorcycle 1 is performed in a manner described hereinbelow. First, a rider 100 operates the automatic transmission operation switch 136 or 137 (FIG. 2). Then, a control device (not shown) of the motorcycle 1 controls the clutch actuator 14 and the shift actuator 70, whereby a series of operations, namely, disengagement of the clutch 11, shifting of speed change gears of the transmission 43, and engagement of the clutch 11 are performed.

Disengaging Operation of Clutch 11

Next, operations for disengagement and disengagement of the clutch 11 by the clutch actuator 14 will be described herein below.

Figure 10:
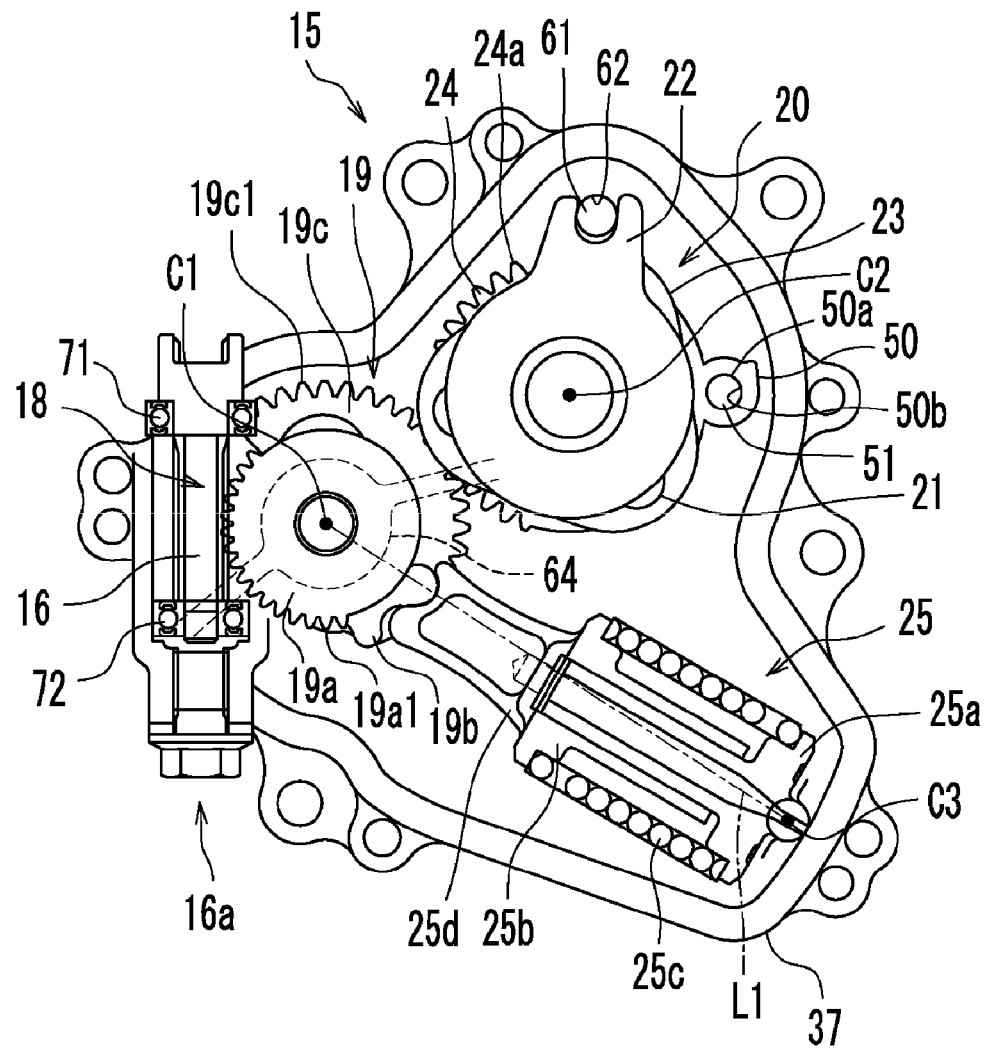
FIG. 10 is a side view of the drive force transmission mechanism at a reference position of an assist spring unit.

FIGS. 9, 10 and 11 are side views of the drive force transmission mechanism 15. FIG. 11 shows the state where the clutch 11 is engaged. FIG. 10 shows the state where the clutch 11 starts to be disengaged. FIG. 9 shows the state where the clutch 11 is disengaged.

As shown in FIGS. 11 and 10, when the clutch actuator 14 operates and the worm shaft 16 rotates, the first solid of revolution 19 rotates in the clockwise direction. The first solid of revolution 19 engages with the second solid of revolution 24, and thus, when the first solid of revolution 19 rotates in the clockwise direction, the second solid of revolution 24 rotates in the counterclockwise direction. A zone from the position where the clutch 11 is engaged (the position shown in FIG. 11) to the position where the clutch 11 starts to be disengaged (the position shown in FIG. 10, which hereinbelow will be referred to as a "disengagement start position") is a so-called "idle zone," in which high loads are not applied to the clutch actuator 14.

At the disengagement start position, the center pivot axis C3 of the assist spring unit 25, a contact point between the contact portion 25d of the assist spring unit 25 and the cam portion 19b of the first solid of revolution 19, and the axis of rotation C1 of the first solid of revolution 19 are linearly aligned. Hence, the biasing force of the assist spring unit 25 does not act as a force that causes the rotation of the first solid of revolution 19. More specifically, the assist force of the assist spring unit 25 becomes zero.

When the worm shaft 16 further rotates from the disengagement start position, the first solid of revolution 19 further rotates in the clockwise direction. In addition, in accordance with the rotation of the first solid of revolution 19, the second solid of revolution 24 further rotates in the counterclockwise direction. Then, as shown in FIG. 9(b), the balls 21 of the ball plate 23 of the ball cam 20 slightly roll upward in the cam groove formed by the cam surface 22b of the cam plate 22 and the cam surface 24b of the second solid of revolution 24. As a consequence, the cam plate 22 is pressed outward by the balls 21 in the direction to cause disengagement of the clutch 11. More specifically, the cam plate 22 is compressed towards the righthand side of the vehicle, and moves with the slide shaft 455 to the righthand side (see FIG. 17). Thus, the pressure plate 451 is moved to the righthand side of FIG. 17, and the clutch 11 is disengaged.

As shown in FIG. 9a, when the first solid of revolution 19 rotates in the clockwise direction beyond the disengagement start position, the contact point between contact portion 25d of the assist spring unit 25 and the cam portion 19b of the first solid of revolution 19 shifts below the line between the center pivot axis C3 of the assist spring unit 25 and the axis of rotation C1 of the first solid of revolution 19. Hence, the biasing force of the assist spring unit 25 acts as a force for rotating the first solid of revolution 19 in the clockwise direction, that is, as an assist force in the direction causing disengagement of the clutch 11. Thereby, the load of the clutch actuator 14 is reduced.

The operation in the event of disengagement of the clutch 11 is performed as described above. In the event of engagement of the clutch 11, the reverse operation relative to the above-described operation is performed.

Assembly Method and Zero-Point Regulation Method

An assembly method for the clutch actuator 14 and the drive force transmission mechanism 15 and positioning of the reference position of the assist spring unit 25 will be described hereinbelow. As shown in FIG. 10, the reference position of the assist spring unit 25 is a position where a line L1 matches with an expansion/compression direction of the assist spring unit 25. The line L1 is a line connecting the center pivot axis C3 on one end side of the assist spring unit 25 and the axis of rotation C1 of the first solid of revolution 19.

Figure 7:
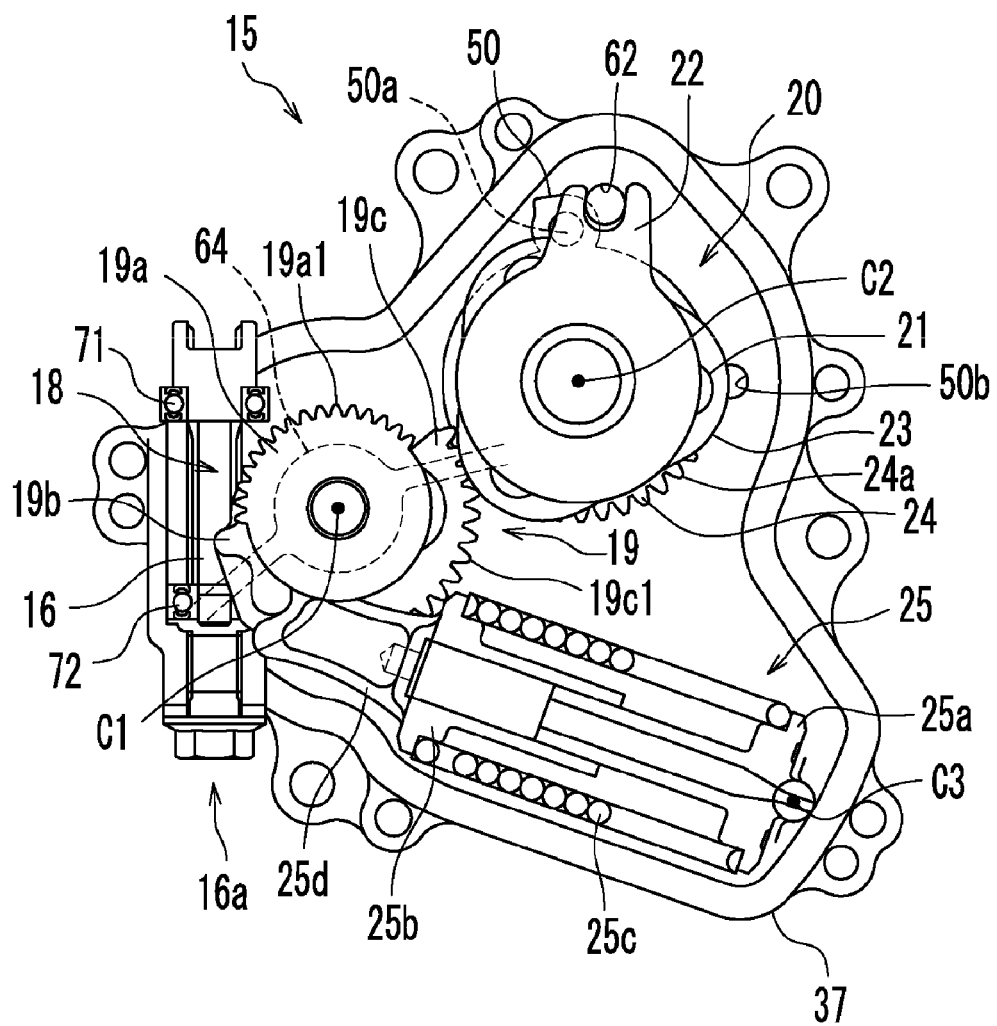
FIG. 7 is a side view of a drive force transmission mechanism during assembly.

First, as shown in FIGS. 7 and 14, in the state where the cover 38 and the case cover 32 are removed, the first solid of revolution 19 and the assist spring unit 25 are mounted to the case body 37. The first solid of revolution 19 is engaged with the shaft 76 that is supported by the bearing member 75, which is supported by the case body 37, and the bearing member 74, which is supported by the case cover 32.

At an initial assembly position described above, the assist spring unit 25 is in a fully expanded state, and the compression coil spring 25c of the assist spring unit 25 is in a steady state while a load is not imposed. Hence, the assist spring unit 25 can be easily mounted.

Next, the ball cam 20 is mounted to the case body 37. In this event, a portion of the teeth 19c1 of the first solid of revolution 19 and a portion of the teeth 24a of the second solid of revolution 24 are meshed with one another on the reverse side of the ball plate 23.

Next, as shown in FIG. 22, the case cover 32 incorporating the worm shaft 16 is overlaid on the case body 37, and is then closed. In the present embodiment, the case cover 32 is fixed to the case body 37 with fasteners 93, such as screws and bolts. Further, the drive shaft 14B of the clutch actuator 14 is inserted into the cylindrical portion 28 located in the case cover 3, by which the clutch actuator 14 is mounted to the case cover 32. Thereby, the state is created in which the drive shaft 14B of the clutch actuator 14, the worm shaft 16, the first solid of revolution 19, and the second solid of revolution 24 are operatively connected together.

Then, a lid 29 located in a lower portion of the cylindrical portion 28 is opened, a lower end of the cylindrical portion 28 is thereby opened, a driver is inserted into the engagement groove 16a of the worm shaft 16, and then the worm shaft 16 located in the interior of the cylindrical portion 28 is rotated from the exterior portion of the case cover 32. With the rotation of the worm 16, the first solid of revolution 19 and the second solid of revolution 24 rotate, and the second solid of revolution 24 rotates clockwise as viewed on FIG. 7. When, with the rotation of the driver, the cam plate 22 of the ball cam 20 has reached the position of a pin hole 62 of the stopper pin 61, the stopper pin 61 is passed through from a stopper pin through hole 63 to temporarily fix the cam plate 22. By the temporary fixing, the cam plate 22 cannot rotate about an axis of rotation C2. However, temporarily fixing refers to a fixing manner in which the stopper pin 61 is not inserted into the pin hole 62 located in the case body 37 so that the marker member 50 of the second solid of revolution 24 is able to rotate about the axis of rotation C2 of the slide shaft 455 without interfering with the stopper pin 61.

Figure 8:
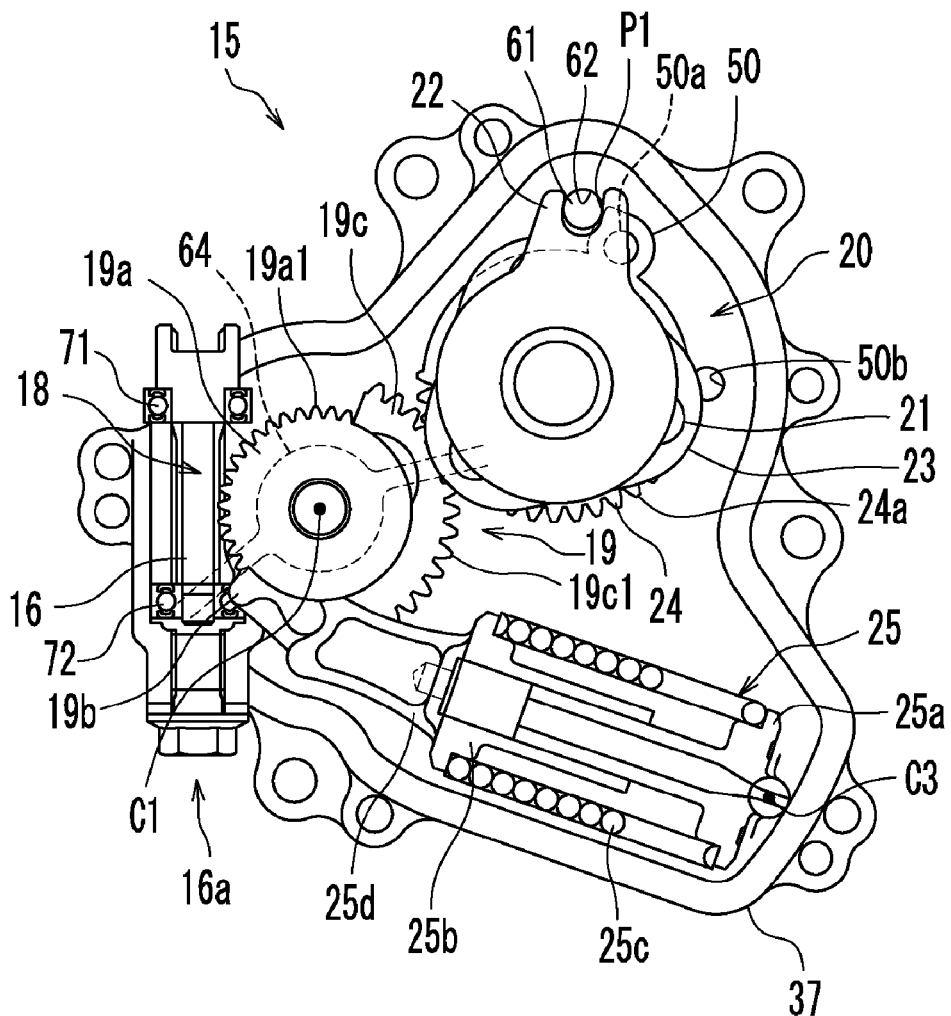
FIG. 8 is a side view of the drive force transmission mechanism of FIG. 7 at a mechanical disengagement side stopper position (clutch disengagement event).

Next, as shown in FIG. 8, the worm shaft 16 is rotated by the driver, and the second solid of revolution 24 is continued to be rotated until where the marker member 50 is past the stopper pin 61. At his position, the stopper pin 61 temporarily fixing the cam plate 22 is now inserted into the pin hole 62, thereby determining the position of the cam plate 22. Further, since the marker member 50 is caused to interfere with the stopper pin 61, excessive reverse rotation of the second solid of revolution 24 is inhibited.

Then the rotation of the driver is further continued. When the drive force transmission mechanism 15 has shifted to the state of FIG. 10 from the state of FIG. 9, a positioning pin 51 is inserted from the opening 33 at the position where the positioning pin insertion hole 50a of the marker member 50 provided in the second solid of revolution 24 overlaps with a reference position hole 50b formed in the case body 37, as shown in FIG. 22. The position where the positioning pin insertion hole 50a of the marker member 50 overlaps with the reference position hole 50b formed in the case body 37 coincides with the reference position of the assist spring unit 25. Since the positioning pin 51 is removed later, it is not specifically limited in size inasmuch as it passes through, for example, the positioning pin insertion hole 50a and the reference position hole 50b.

Figure 18:
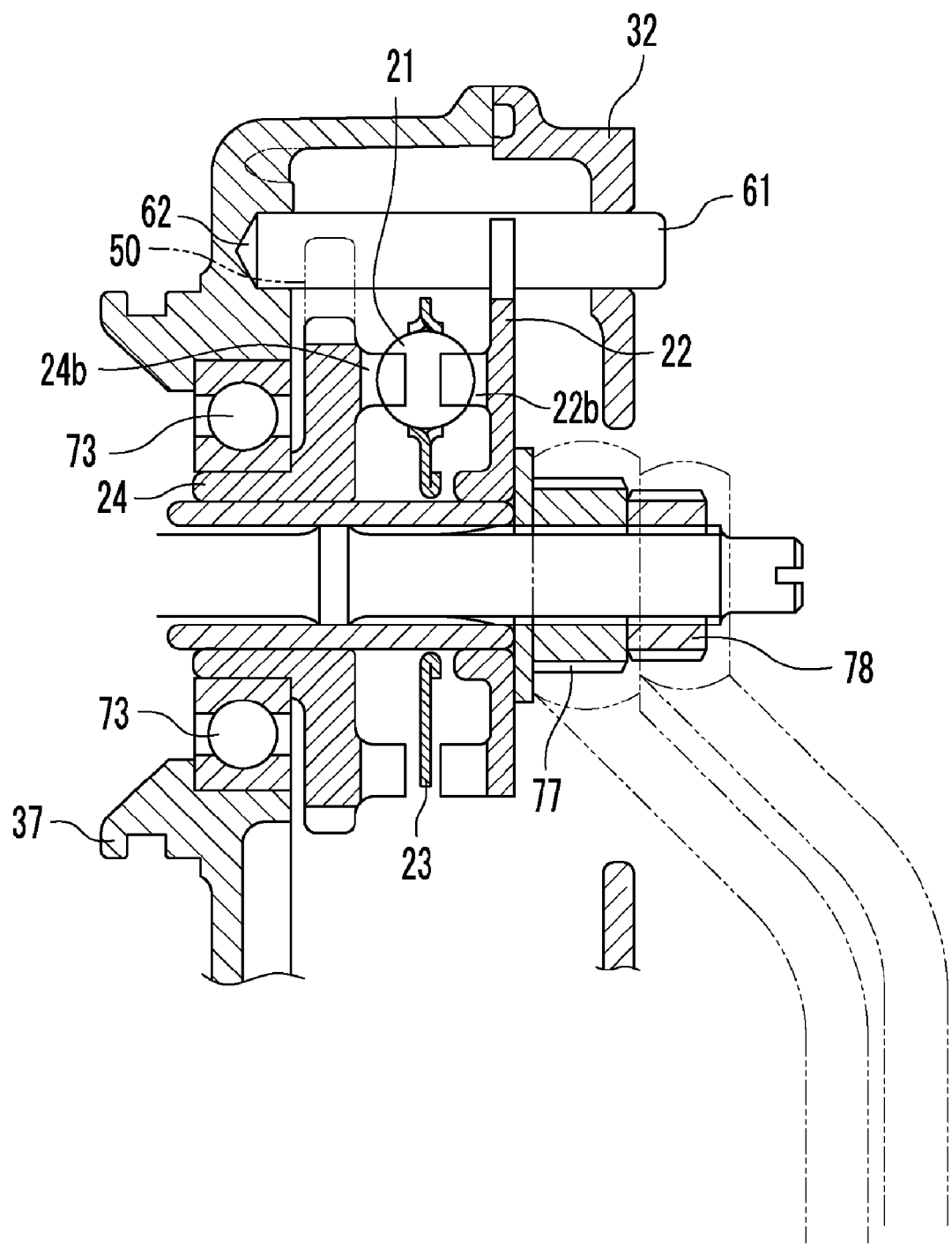
FIG. 18 is a cross sectional view of the ball cam at the reference position of the assist spring unit.

Then, as shown in FIG. 18, in the state where the driver is separated from the engagement groove 16a and the positioning pin 51 remains inserted in the reference position hole 50b, an adjustment bolt 77 is tightened with a torque wrench to a specified torque. Here, the specified torque is a torque that causes the clutch 11 to be set to the disengagement start position, or a torque that causes the clutch 11 to be set to a so-called "partial clutch engagement state." After the adjustment bolt 77 is tightened, a fixing bolt 78 is tightened to fix the adjustment bolt 77. Thereby, when the clutch 11 is set to the disengagement start position, the assist spring unit 25 is also set to the reference position.

Subsequently, the positioning pin 51 is pulled out, thereby returning the clutch drive apparatus to a state in which the second solid of revolution 24 is rotatable. Thereafter, as shown in FIG. 21, the maintenance lid 34 is overlaid so as to cover the opening 33 provided to the case cover 32. Thereafter, the potentiometer 80 is mounted. The potentiometer 80 includes elongated holes 80a for potential position adjustment. Hence, the potentiometer 80 can be laterally shifted, so that the position of the potentiometer 80 can be easily and finely adjusted.

The stopper pin 61 is set to a rotation limitation position P1 in the event of clutch disengagement of the second solid of revolution 24. More specifically, as shown in FIG. 8, during rotation in the event of clutch disengagement, the second solid of revolution 24 rotates counterclockwise in association with the rotation received from the first solid of revolution 19. However, the counterclockwise rotation is inhibited through contact with the stopper pin 61. Conversely, as a component indicative of a rotation limitation position P2 in the event of clutch engagement, there is provided a stopper 64 that contacts the gear portion 19c of the first solid of revolution 19 (see FIG. 15) to thereby limit the rotation of the gear portion 19c. The stopper 64 is a rib formed on the surface of the interior of the case body 37.

Figure 15:
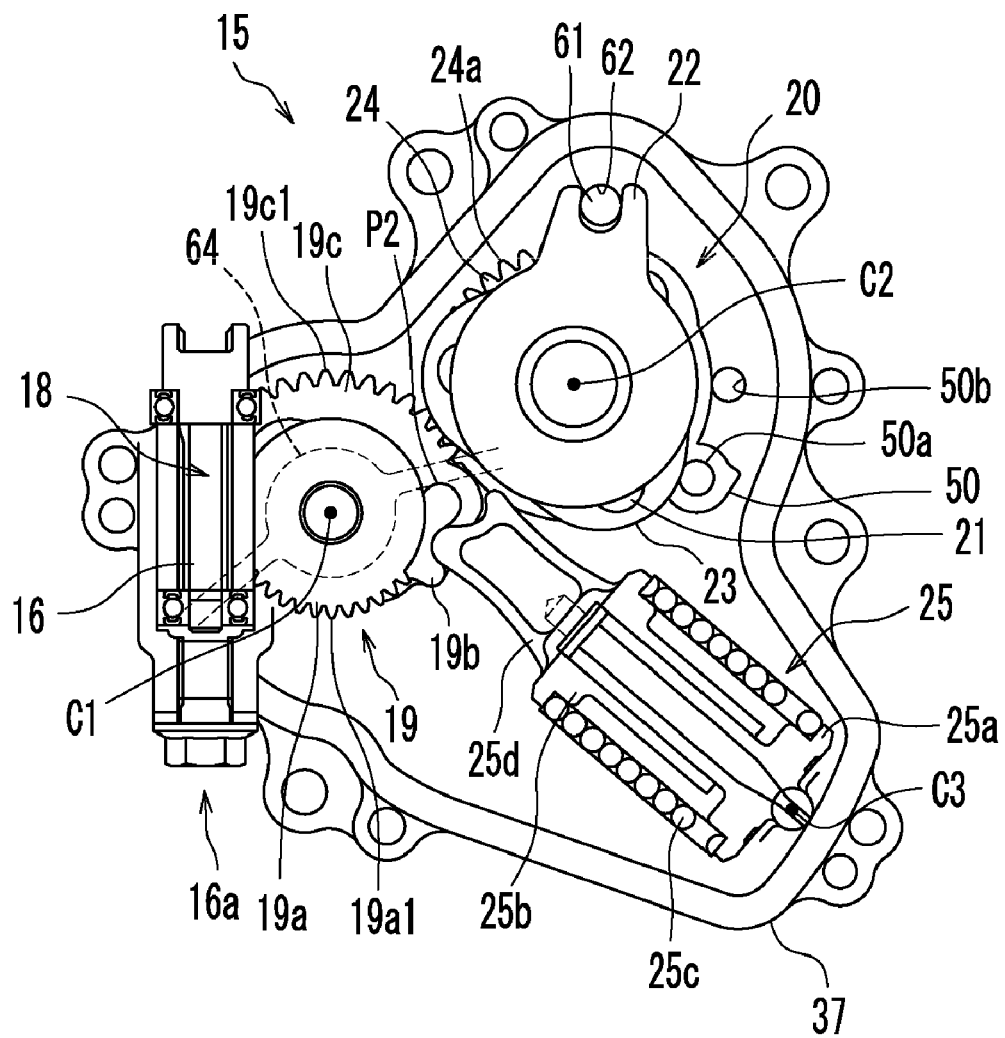
FIG. 15 is a side view of the drive force transmission mechanism at a mechanical return side stopper position (clutch engagement event).

In the event of a state change of the clutch 11 from a disengagement position to a clutch engagement position, the first solid of revolution 19 rotates clockwise until the second solid of revolution 24 contacts the stopper pin 61. Then, the first solid of revolution 19 rotates counterclockwise, and as shown in FIG. 15, the subsequent rotation thereof is inhibited at the position of contact between the rib formed on the surface of the case body 37 and the gear portion 19c of the first solid of revolution 19. More specifically, the drive force transmission mechanism 15 is configured such that, in the course of reaching the disengagement of the clutch 11 from the engagement thereof, the operation is performed in the manner such that a range from the position P1 (FIG. 8) where the marker member 50 of the second solid of revolution 24 contacts the stopper pin 61 to the position P2 (FIG. 15) where the first solid of revolution 19 contacts the stopper 64 is used as a rotational range for the first solid of revolution 19 and the second solid of revolution 24.

The roles of the stopper pin 61 and the stopper 64 are to limit the rotational range of the drive force transmission mechanism 15, thereby to prevent unnecessary loads from being exerted on the potentiometer 80 when over rotation occurs in the drive force transmission mechanism 15. Further, since the rotational range is defined, a rotational drive zone is defined also in the clutch actuator 14.

As described above, in the clutch drive apparatus of the present embodiment, the adjustment of the reference position of the assist spring unit 25 and the disengagement start position of the clutch 11 can be achieved only by removal of the potentiometer 80 and the maintenance lid 34.

EFFECTS OF THE EMBODIMENT

As described above, according to the clutch drive apparatus 90, the idle amount of the clutch 11 can be easily adjusted. With the marker member 50 being used to maintain the assist spring unit 25 at the reference position, the disengagement start position of the clutch 11 is adjusted. Hence, an electronic device, such as a clutch disengagement sensor including an electronic function, does not have to be additionally mounted.

Further, in the clutch drive apparatus 90 of the present embodiment, the first solid of revolution 19 and the assist spring unit 25 are supported by the case body 37, and the clutch actuator 14 is supported by the case cover 32 incorporating the worm shaft 16. Hence, the idle amount of the clutch 11 cannot be adjusted until after the case cover 32 is closed on the case body 37. However, the opening 33 for exposing the marker member 50 is formed in the case cover 32. Hence, when adjusting the idle amount, the idle amount can be adjusted with the closed case cover 32 by removing the maintenance lid 34 is opened to expose the marker member 50.

Further, the position of the drive force transmission mechanism 15 can be adjusted from the exterior portion by removing the lid 29 in the lower portion of the cylindrical portion 28 located in the case cover 32. Once removed, a driver may be used to engage the engagement groove 16a from the lower portion of the cylindrical portion 28, and the worm shaft 16 may be forcibly rotated with the driver from the exterior portion. As a consequence, the position of the assist spring unit 25 connected to the first solid of revolution 19 of the drive force transmission mechanism 15 can be adjusted also. Hence, the idle amount of the clutch 11 can be easily adjusted by rotating the worm shaft 16 with the driver to thereby set the assist spring unit 25 to the reference position, and then the meet point of the clutch 11 is adjusted.

In the clutch drive apparatus 90 of the present embodiment, the potentiometer 80 is provided on the surface of the case cover 32 to read the rotational position of the first solid of revolution 19. When the first solid of revolution 19 and the second solid of revolution 24 rotate beyond the predetermined position, excessively high loads are exerted on the potentiometer 80. However, according to the clutch drive apparatus 90, the rotation to the predetermined position or more is inhibited by the stopper 64 and the stopper pin 61. Hence, excessively high loads can be prevented from being exerted on the potentiometer 80.

In the present embodiment, the adjustment bolt 77 (FIG. 18) for adjusting the disengagement start position of the clutch 11 is disposed in the position where the adjustment bolt 77 is exposed to the exterior portion of the case cover 32 through the opening 33 of the case cover 32. Hence, the disengagement start position of the clutch 11 can be adjusted with the closed case cover 32 in the manner that the maintenance lid 34 is opened to thereby expose the adjustment bolt 77.

In the clutch drive apparatus 90 of the present embodiment, the reference position of the assist spring unit 25 can be easily maintained in the manner that the positioning pin 51 is inserted through the positioning hole 50*a* of the marker member 50 provided to the second solid of revolution 24. Thereby, the operation of adjusting the idle amount of the clutch 11 can be easily executed only through adjustment of the mechanical portion. The positioning pin 51, which is used in the event of positioning of the reference position, is removed after the positioning, so that the positioning pin 51 is not specifically limited in size inasmuch as it passes through, for example, the positioning hole 50*a* and the reference position hole 50*b*.

MODIFIED EXAMPLE

The exemplary embodiment described hereinabove is but one of a number of embodiments for practicing the present invention. The present invention can be carried out in various other embodiments.

In the embodiment described above, the vehicle including the vehicular power unit 35 of the embodiment described above is exemplified as the motorcycle 1. However, the vehicle of the present invention is not limited to the motorcycle 1, but may be any one of other straddle-type vehicles, such as ATVs. Further, the vehicle of the present invention may be any one of vehicles other than straddle-type vehicles.

In the embodiment described above, there are provided two solids of revolution, namely the first solid of revolution 19 and the second solid of revolution 24 of the drive force transmission mechanism 15. However, the number of solids of revolution of the drive force transmission mechanism 15 may be two or more.

In the embodiment described above, the potentiometer 80 is mounted to read the rotational position of the first solid of revolution 19. However, in the case where two or more solids of revolution are provided in the drive force transmission mechanism 15, the potentiometer 80 may be mounted to read the rotational position of a solid of revolution other than the first solid of revolution 19.

In the embodiment described above, the marker member 50 for use in positioning the reference position of the assist spring unit 25 is provided on the second solid of revolution 24. However, in the case where two or more solids of revolution are provided in the drive force transmission mechanism 15, the configuration may be such that the marker member 50 is provided to a solid of revolution other than the second solid of revolution 24, and the reference position is determined by the solid of revolution other than the second solid of revolution 24.

In the embodiment described above, the marker member 50 comprises a positioning hole 50*a*, and the pin 51 is inserted into the reference position hole 50*b* provided in the case body 37, whereby the reference position of the assist spring unit 25 is determined. However, the marker member 50 is not limited to the configuration in which the pin is inserted into the pin hole. For example, a slit may be formed instead of the pin hole. Alternatively, the configuration may be such that a rib is provided in a portion of the reference position hole 50*b* of the case body 37 while a rib is provided in a portion of the positioning hole 50*a* of the marker member 50, in which the positions of the ribs match with each other at the reference position. Still alternatively, the configuration may be such that, for example, a rib is provided in a portion of the reference position hole 50*b* of the case body 37, and a slit is provided in a portion of the positioning hole 50*a* of the marker member 50. In a position where the marker member 50 is set to the reference position of the assist spring unit 25, the rib provided in the case body 37 is inserted into the slit provided to the marker member 50, whereby the reference position is determined.

In the embodiment described above, the mechanism for converting the force direction of the drive force transmission mechanism 15 is the ball cam 20. However, the force direction converting mechanism may be other than the ball cam 20. For example, a worm gear may be used as the force direction converting mechanism.

As the component indicative of the rotational limitation position P2 of the first solid of revolution 19 in the event of engagement of the clutch 11, the stopper 64 is not limited to that described in the embodiment. For example, it may be such that a component, such as a rib or pin-shaped component is provided at the rotation limitation position P2 in the case cover 32 serving as the lid of the case body 37, in which the rotation of the first solid of revolution 19 is inhibited at the position provided to the case cover 32. Further, the rotation limitation positions need not be provided to the first solid of revolution 19 and the second solid of revolution 24, respectively. A rotation limitation position may be provided only to the first solid of revolution 19 for the engagement event and the disengagement event of the clutch 11. Alternatively, the rotation limitation position may be provided only to the second solid of revolution 24.

As described above, the present invention is effective for a clutch drive apparatus including a clutch actuator and for a vehicle including the apparatus.

While embodiments have been described in connection with the figures hereinabove, the invention is not limited to those embodiments, but rather can be modified and adapted as appropriate. Thus, it is to be clearly understood that the above description was made only for purposes of an example and not as a limitation on the scope of the invention as claimed below.

What is claimed:

1. A clutch drive apparatus comprising:
   a clutch;
   a clutch actuator that generates a drive force for causing engagement or disengagement of the clutch;
   a drive force transmission mechanism comprising one or more solids of revolution, including a first solid of revolution coupled to the clutch actuator and configured to transmit the drive force of the clutch actuator to the clutch;

an auxiliary elastic body having a first end pivotally supported and a second end biased away from the first end and operatively coupled to one of the solids of revolution, wherein the auxiliary elastic body urges the first solid of revolution in a direction of disengaging the clutch while the clutch transitions to a disengaged state from a disengagement start position of the clutch; and a marker member provided on one of the solids of revolution, the marker member cooperating with a stationary reference position feature to indicate a reference position wherein a line connecting a center pivot axis of the first end of the auxiliary elastic body and an axis of rotation of the first solid of revolution is aligned with an expansion/compression direction of the auxiliary elastic body while the clutch is in the disengagement start position, wherein the line is not aligned with the expansion/compression direction of the auxiliary elastic body while the clutch is in an engaged position.

2. The clutch drive apparatus of claim 1, wherein the drive force transmission mechanism includes: a worm shaft rotated by a drive shaft of the clutch actuator, the first solid of revolution being configured to mesh with the worm shaft; a case body supporting the first solid of revolution and the auxiliary elastic body; and a case cover that is closed over the case body and adapted to support the clutch actuator and the worm shaft.

3. The clutch drive apparatus of claim 2, wherein the first solid of revolution includes a first teeth portion for meshing with the worm shaft.

4. The clutch drive apparatus of claim 2, wherein an opening for exposing the marker member and the stationary reference position feature is formed in the case cover, and the case cover includes a maintenance lid that covers the opening.

5. The clutch drive apparatus of claim 4, further comprising an adjusting member disposed in a position that is exposed to an exterior portion of the case cover through the opening of the case cover and that may be used to adjust the disengagement start position of the clutch.

6. The clutch drive apparatus of claim 4, further comprising a potentiometer that detects the rotational position of one of the solids of revolution.

7. The clutch drive apparatus of claim 6, wherein adjustment of the reference position of the auxiliary elastic body and the disengagement start position of the clutch can be achieved by removal of the potentiometer and the maintenance lid.

8. The clutch drive apparatus of claim 6, wherein the potentiometer includes elongated mounting apertures.

9. The clutch drive apparatus of claim 8, further comprising a stopper pin that inhibits rotation of one of the solids of revolution beyond a predetermined position, and thereby inhibiting the rotation of the solid of revolution whose rotation is being monitored by the potentiometer beyond the predetermined position.

10. The clutch drive apparatus of claim 9, further comprising an insertion aperture for inserting the stopper pin, the insertion aperture being provided in the case cover.

11. The clutch drive apparatus of claim 10, wherein the maintenance lid removably covers the insertion aperture.

12. The clutch drive apparatus of claim 1, wherein the marker member comprises a positioning aperture provided on any one of the solids of revolution, the marker member permitting a positioning pin to be inserted there through to fix the auxiliary elastic body in the reference position.

13. The clutch drive apparatus of claim 1, wherein the first end of the auxiliary elastic body is pivotally supported in a casing of a vehicular power unit.

14. The clutch drive apparatus of claim 13, wherein the clutch actuator and the drive force transmission mechanism are disposed in the casing of the vehicular power unit.

15. A vehicle comprising the clutch drive apparatus according to claim 1.

16. The clutch drive apparatus of claim 1, wherein the marker member is configured to inhibit reverse rotation of a second solid of revolution beyond a predetermined position.

17. The clutch drive apparatus of claim 1, wherein an idle zone is defined from a position where the clutch is engaged to a position where the clutch starts to get disengaged.

18. A clutch drive apparatus comprising:
a clutch;
a clutch actuator that generates a drive force for causing engagement or disengagement of the clutch;
a drive force transmission mechanism comprising one or more solids of revolution, including a first solid of revolution coupled to the clutch actuator and configured to transmit the drive force of the clutch actuator to the clutch;
an auxiliary elastic body having a first end pivotally supported and a second end biased away from the first end and operatively coupled to one of the solids of revolution, wherein the auxiliary elastic body urges the first solid of revolution in a direction of disengaging the clutch while the clutch transitions to a disengaged state from a disengagement start position of the clutch; and
a marker member provided on one of the solids of revolution, the marker member being indicative of a reference position wherein a line connecting a center pivot axis of the first end of the auxiliary elastic body and an axis of rotation of the first solid of revolution is aligned with an expansion/compression direction of the auxiliary elastic body;
wherein the drive force transmission mechanism includes: a worm shaft rotated by a drive shaft of the clutch actuator, the first solid of revolution being configured to mesh with the worm shaft; a case body supporting the first solid of revolution and the auxiliary elastic body; and a case cover that is closed over the case body and adapted to support the clutch actuator and the worm shaft;
wherein an opening for exposing the marker member is formed in the case cover, and the case cover includes a maintenance lid that covers the opening; and
wherein the case cover further comprises a cylindrical portion for accommodating the worm shaft which is inserted there through along a vertical direction, the worm shaft having an end adapted for engagement with a tool that may be used to forcibly rotate the worm from an exterior portion of the case cover.

19. A clutch drive apparatus comprising:
a clutch;
a clutch actuator that generates a drive force for causing engagement or disengagement of the clutch;
a drive force transmission mechanism comprising one or more solids of revolution, including a first solid of revolution coupled to the clutch actuator and configured to transmit the drive force of the clutch actuator to the clutch;
an auxiliary elastic body having a first end pivotally supported and a second end biased away from the first end and operatively coupled to one of the solids of revolution, wherein the auxiliary elastic body urges the first solid of revolution in a direction of disengaging the clutch while the clutch transitions to a disengaged state from a disengagement start position of the clutch; and a marker member provided on one of the solids of revolution, the marker member being indicative of a reference position wherein a line connecting a center pivot axis of the first end of the auxiliary elastic body and an axis of rotation of the first solid of revolution is aligned with an expansion/compression direction of the auxiliary elastic body; wherein:

the clutch includes a slide shaft having a longitudinal axis that is coaxial with an axis of rotation of the clutch, the clutch being disengaged and engaged by moving the slide shaft along the longitudinal axis;

the clutch actuator includes a rotatable drive shaft that extends in a direction that is perpendicular to the longitudinal axis;

the drive force transmission mechanism is configured to transmit the drive force of the clutch actuator to the slide shaft, and the drive force transmission mechanism further comprises:
- a worm shaft coupled to a rotatable drive shaft of the clutch actuator;
- a worm wheel portion on the first solid of revolution which meshes with the worm shaft and causes the first solid of revolution to rotate about an axis of rotation which is parallel to the longitudinal axis of the slide shaft in accordance with rotation of the worm shaft;
- a second solid of revolution in rotatable engagement with the first solid of revolution and which rotates about an axis of rotation coincident with the longitudinal axis of the slide shaft in accordance with rotation of the first solid of revolution; and
- a force direction converting mechanism which converts torque from the second solid of revolution into a force acting in the axial direction of the slide shaft and which moves the slide shaft in the axial direction in accordance with rotation of the second solid of revolution;

the second end of the auxiliary elastic body is operatively connected to the first solid of revolution; and the marker member is provided on the second solid of revolution.

20. A clutch drive apparatus comprising:
a clutch;
a clutch actuator that generates a drive force for causing engagement or disengagement of the clutch;
a drive force transmission mechanism comprising one or more solids of revolution, including a first solid of revolution coupled to the clutch actuator and configured to transmit the drive force of the clutch actuator to the clutch;
an auxiliary elastic body having a first end pivotally supported and a second end biased away from the first end and operatively coupled to one of the solids of revolution, wherein the auxiliary elastic body urges the first solid of revolution in a direction of disengaging the clutch while the clutch transitions to a disengaged state from a disengagement start position of the clutch;
a marker member provided on one of the solids of revolution, the marker member being indicative of a reference position wherein a line connecting a center pivot axis of the first end of the auxiliary elastic body and an axis of rotation of the first solid of revolution is aligned with an expansion/compression direction of the auxiliary elastic body; and
a force direction converting mechanism that converts torque of a second solid of revolution that rotates in response to the first solid of revolution into a force in the axial direction of a clutch slide shaft, the clutch being disengaged and engaged by moving the slide shaft along the axial direction in response to the rotation of the second solid of revolution;
wherein the drive force transmission mechanism includes: a worm shaft rotated by a drive shaft of the clutch actuator, the first solid of revolution being configured to mesh with the worm shaft; a case body supporting the first solid of revolution and the auxiliary elastic body; and a case cover that is closed over the case body and adapted to support the clutch actuator and the worm shaft; and
wherein the drive force transmission mechanism includes: a worm shaft rotated by a drive shaft of the clutch actuator, the first solid of revolution being configured to mesh with the worm shaft; a case body supporting the first solid of revolution and the auxiliary elastic body; and a case cover that is closed over the case body and adapted to support the clutch actuator and the worm shaft.

* * * * *